(12) United States Patent
Tin

(10) Patent No.: US 8,937,644 B2
(45) Date of Patent: Jan. 20, 2015

(54) STEREOSCOPIC IMAGE CAPTURE

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 13/426,536

(22) Filed: Mar. 21, 2012

(65) Prior Publication Data

US 2013/0250062 A1    Sep. 26, 2013

(51) Int. Cl.
*H04N 13/02* (2006.01)
*G06T 7/00* (2006.01)

(52) U.S. Cl.
CPC ............ *H04N 13/0203* (2013.01); *G06T 7/002* (2013.01)
USPC ............... 348/46; 348/53; 348/241; 348/246; 382/264; 382/274; 382/275; 386/230; 396/324; 345/419; 345/679

(58) Field of Classification Search
CPC .......... H04N 13/0018; H04N 13/0055; H04N 13/0203; G06T 7/002; G06T 7/0022; G06T 7/0051; G03B 35/00; G03B 35/10
USPC ...................... 348/46, 53, 241, 246, E13.074; 382/264, 274, 275; 345/419, 679; 386/230; 396/324
See application file for complete search history.

(56) References Cited

U.S. PATENT DOCUMENTS

| 4,751,570 | A | 6/1988 | Robinson | |
|---|---|---|---|---|
| 6,512,892 | B1 * | 1/2003 | Montgomery et al. | ....... 396/326 |
| 6,798,406 | B1 | 9/2004 | Jones et al. | |
| 7,636,088 | B2 | 12/2009 | Nomura et al. | |
| 7,643,552 | B2 | 1/2010 | Saishu et al. | |
| 2010/0039499 | A1 | 2/2010 | Nomura et al. | |
| 2011/0228049 | A1 * | 9/2011 | Kazakevich et al. | ............ 348/45 |
| 2012/0019528 | A1 * | 1/2012 | Ugawa et al. | ................. 345/419 |
| 2012/0162374 | A1 * | 6/2012 | Markas et al. | ................... 348/46 |
| 2012/0200670 | A1 * | 8/2012 | Pockett | ........................... 348/46 |

FOREIGN PATENT DOCUMENTS

WO    WO 2011158573 A1  *  12/2011

OTHER PUBLICATIONS

Rajagopalan, A. N.; Chaudhuri, S.; Mudenagudi, U., "Depth estimation and image restoration using defocused stereo pairs," Pattern Analysis and Machine Intelligence, IEEE Transactions on, vol. 26, No. 11, pp. 1521,1525, Nov. 2004.*

(Continued)

*Primary Examiner* — Sath V Perungavoor
*Assistant Examiner* — Daniel Chang
(74) *Attorney, Agent, or Firm* — Fitzpatrick, Cella, Harper & Scinto

(57) ABSTRACT

Stereoscopic image capture is provided. A blur value expected for multiple pixels in left and right images is predicted. The blur value is predicted based on designated capture settings. A disparity value expected for multiple pixels in the left and right images is predicted. The disparity value is predicted based on the designated capture settings. Stressed pixels are identified by comparing the predicted disparity value to a lower bound of disparity value determined from the predicted blur value using a predetermined model. A pixel with predicted disparity value less than the lower bound is identified as a stressed pixel. The predicted disparity is adjusted by modifying the designated capture settings to reduce the number of stressed pixels, or an alert to the presence of stressed pixels is given to the user.

20 Claims, 17 Drawing Sheets

(56) References Cited

OTHER PUBLICATIONS

Robert T. Held, Emily A. Cooper, James F. O'Brien, and Martin S. Banks. "Using blur to affect perceived distance and size." ACM Trans. Graph. 29, 2, Article 19 (Apr. 2010).*

Held, et al., "Using blur to affect perceived distance and size", ACM Transactions on Graphics, 29, 2, 19 (2010).

http://en.wikipedia.org/wiki/Accommodation_%28eye%29, last modified on Feb. 20, 2012.

http://en.wikipedia.org/wiki/Vergence, last modified on Feb. 5, 2011.

http://gizmodo.com/5430372/how-to-not-get-a-headache-during-avatar, last modified on Dec. 19, 2009.

Devernay, et al., "Steeoscopic Cinema", Image and Geometry Processing for 3-D Cinematography, Springer Berlin Heidelberg (Ed.) (2010).

Mon-Williams, et al., "Design factors in stereoscopic virtual-reality displays", Society for Information Display (1995).

* cited by examiner

STEREOSCOPIC IMAGE CAPTURE

FIELD

The present disclosure relates to stereoscopic image capture, and more particularly relates to creation of stereoscopic 3-D content.

BACKGROUND

In the field of creation of stereoscopic 3-D content (such as stereoscopic 3-D motion pictures), it is common to provide left and right images with horizontal disparity, which creates an illusion of depth.

SUMMARY

In practice, however, horizontal disparity is not the only depth cue to a viewer. In particular, blur (e.g., due to defocus) is also a depth cue. For comfortable viewing of stereoscopic 3-D content, all depth cues present in the stereoscopic 3-D image need to be consistent (within a tolerance subject to the viewer's ability to fuse and interpret the stereoscopic 3-D image). When content creators such as directors and cinematographers manipulate blur for the purpose of storytelling and aesthetics (as they have been doing for 2-D cinema), the respective depth cues from blur and horizontal disparity may conflict with each other, causing discomfort to the viewer.

The foregoing situation is addressed during image capture, by predicting and identifying pixels for which the blur value and the disparity value provide conflicting depth cues by an amount that may cause discomfort to a viewer. Such pixels are hereinafter referred to as "stressed" pixels. The expected disparity values and blur values for the pixels are predicted based on initial designated capture settings. As described herein, stressed pixels are identified based on predicted disparity values and predicted blur values for the pixels. Capture settings may then be adjusted to reduce the number of stressed pixels, or a user may be alerted to the presence of the stressed pixels.

The blur and disparity values can be predicted with or without actual image capture, based on the capture settings and/or preview images.

Image capture includes the notions of capture of a real scene as well as creation of stereoscopic 3-D content by computer graphics generation, and a mixture of these techniques.

Thus, in an example embodiment described herein, stereoscopic image capture is provided. A blur value expected for multiple pixels in left and right images is predicted. The blur value is predicted based on designated capture settings. A disparity value expected for multiple pixels in the left and right images is predicted. The disparity value is predicted based on the designated capture settings. Stressed pixels are identified by comparing the predicted disparity value to a lower bound of disparity value determined from the predicted blur value using a predetermined model. A pixel with predicted disparity value less than the lower bound is identified as a stressed pixel. The predicted disparity is adjusted by adjusting the designated capture settings to reduce the number of stressed pixels.

By identifying stressed pixels based on predicted disparity values and predicted blur values for the pixels, and adjusting capture settings to reduce the number of stressed pixels, it is ordinarily possible to reduce discomfort to the user caused by conflicting depth cues in a stereoscopic 3-D image.

In another example embodiment, stereoscopic image capture is provided. A blur value expected for multiple pixels in left and right images is predicted. The blur value is predicted based on designated capture settings. A disparity value expected for multiple pixels in the left and right images is predicted. The disparity value is predicted based on the designated capture settings. Stressed pixels are identified by comparing the predicted disparity value to a lower bound of disparity value determined from the predicted blur value using a predetermined model. A pixel with predicted disparity value less than the lower bound is identified as a stressed pixel. The user is alerted to the presence of the stressed pixels.

This brief summary has been provided so that the nature of this disclosure may be understood quickly. A more complete understanding can be obtained by reference to the following detailed description and to the attached drawings.

DETAILED DESCRIPTION

In the following example embodiments, there is described a digital camera which may be a digital still camera or a digital video camera. It is understood, however, that the following description encompasses arbitrary arrangements which can incorporate or utilize imaging assemblies with capture optics, for instance, a data processing apparatus having an image sensing function (e.g., a personal computer) or a portable terminal having an image sensing function (e.g., a mobile telephone), or a video camera.

Figure 1A:
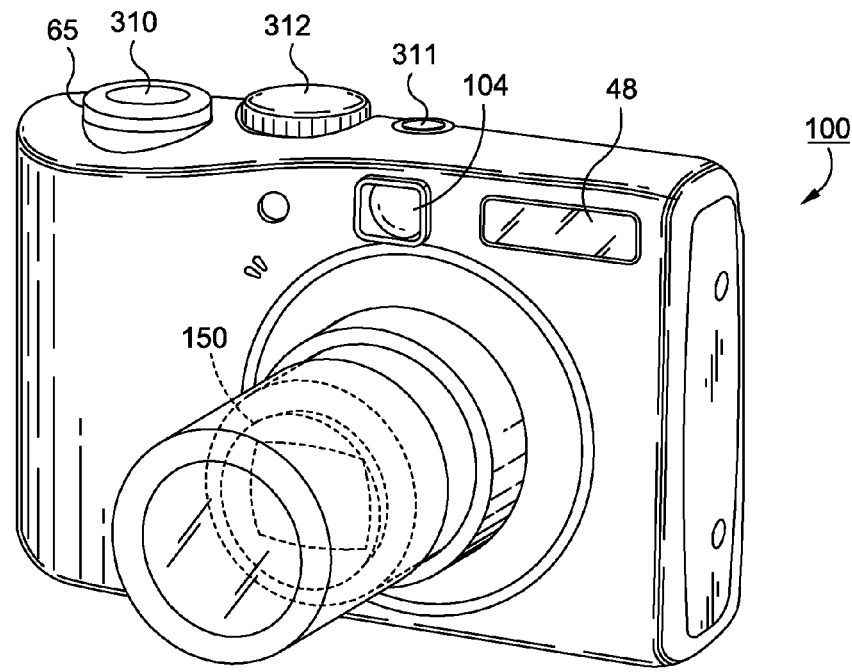
FIGS. 1A and 1B are views depicting an external appearance of an image capture device according to an example embodiment.
Figure 1B:
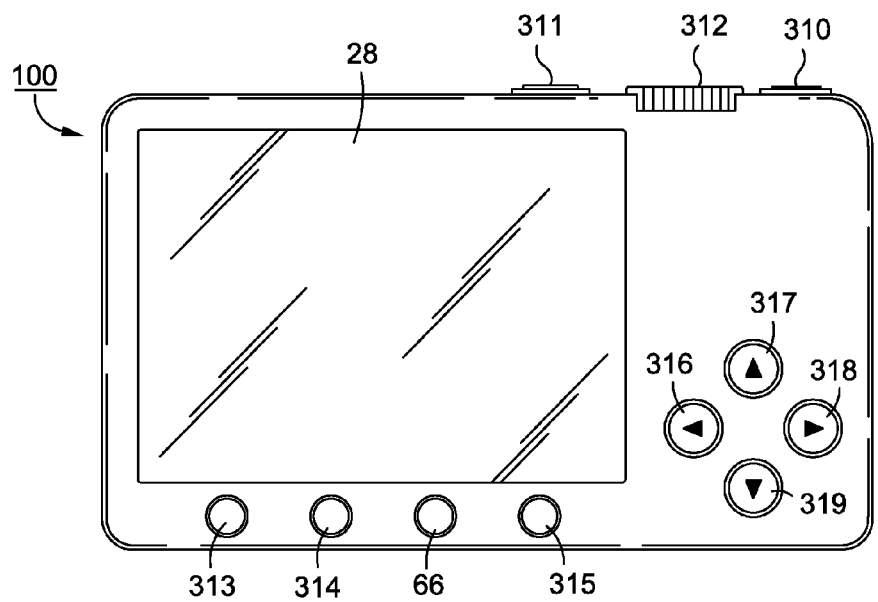

FIGS. 1A and 1B are views showing an example of an external appearance of an image capture device 100 according to an example embodiment. Note that in these figures, some components are omitted for conciseness. A user operates buttons and switches 310 to 319 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Capture optics 150 include hardware and/or software for capturing stereoscopic image content. In that regard, several arrangements are possible for capture optics 150, including two lenses combined with two sensors, one sensor combined with one lens and optics which split (e.g., with dual apertures) and direct left and right images to different parts of the sensor, or two lenses combined with intermediate optics and one sensor, among others. Example embodiments are described more fully below with respect to FIGS. 1C to 1F.

The power button 311 is provided to start or stop the digital camera 100, or to turn ON/OFF the main power of the digital camera 100. The menu button 313 is provided to display the setting menu such as shooting parameters and operation modes of the digital camera 100, and to display the status of the digital camera 100. The menu includes selectable items or items whose values are variable.

A delete button 315 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 314 is pressed for selecting a mode or an item. When the enter button 314 is pressed, the system controller 50 in FIG. 2A sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 318, an up button 317, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

FIGS. 1C to 1F are views for explaining capture optics for capturing stereoscopic 3-D content (e.g., capture optics 150) according to example embodiments. These embodiments are shown merely for purposes of example, and other arrangements are possible.

Figure 1C:
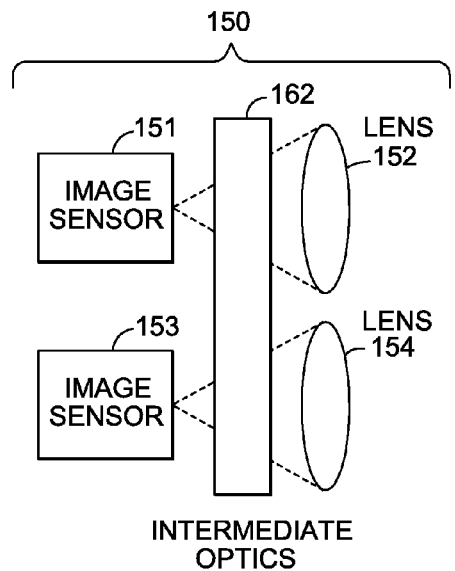
FIGS. 1C to 1F are views for explaining capture optics according to example embodiments.

In particular, FIG. 1C depicts an example embodiment in which capture optics 150 includes two image sensors, namely image sensor 151 and image sensor 153, and two lenses 152 and 154. According to this example embodiment, each sensor is associated with a single lens, to focus image data on the corresponding sensor, e.g., for left and right images. The intermediate optics 162 lies between the image sensors and the lenses and may perform functions such as exposure control or optical filtering, e.g., anti-alias filtering.

Figure 1D:
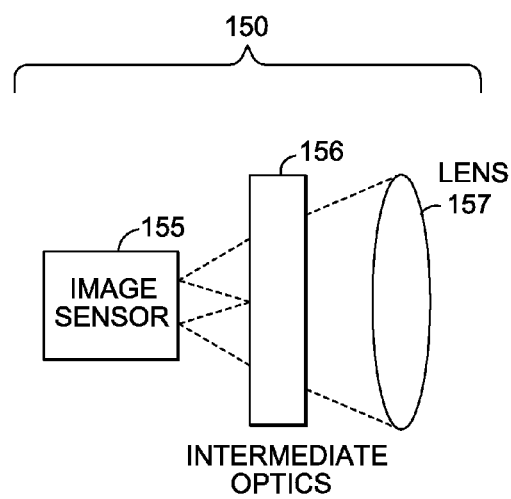

FIG. 1D depicts another example embodiment in which capture optics 150 includes a single image sensor 155 and a single lens 157, with intermediate optics 156 therebetween. In that regard, intermediate optics 156, in addition to perform functions such as exposure control or optical filtering, may be used to split incoming light from lens 157 into left and right views and direct the views to different parts of image sensor 155 as left and right images. Intermediate optics 156 may include, for example, dual apertures, polarizers or other optical modulators.

Figure 1E:
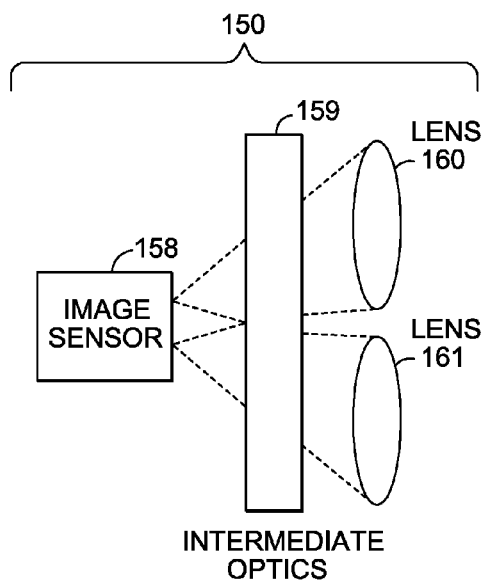

FIG. 1E depicts yet another example embodiment in which capture optics 150 include a single sensor 158, intermediate optics 159, and two lenses 160 and 161. In this embodiment, intermediate optics 159, in addition to perform functions such as exposure control or optical filtering, directs light from lenses 160 and 161 to different parts of image sensor 158.

Figure 1F:
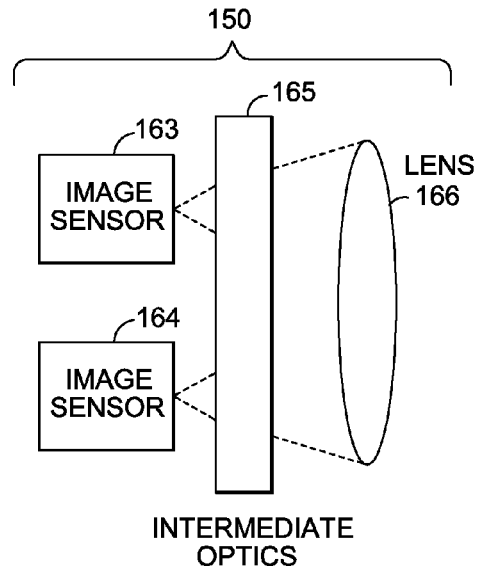

FIG. 1F depicts yet another example embodiment in which capture optics 150 include two image sensors namely image sensor 163 and image sensor 164, and a single lens 166, with intermediate optics 165 therebetween. In that regard, intermediate optics 165, in addition to perform functions such as exposure control or optical filtering, may be used to split incoming light from lens 166 into left and right views and direct the views to image sensors 163 and 164 as left and right images respectively. Intermediate optics 165 may include, for example, dual apertures, polarizers or other optical modulators.

Naturally, it is possible to use other embodiments which capture two separate views of a scene, including embodiments using more than one camera.

Figure 2A:
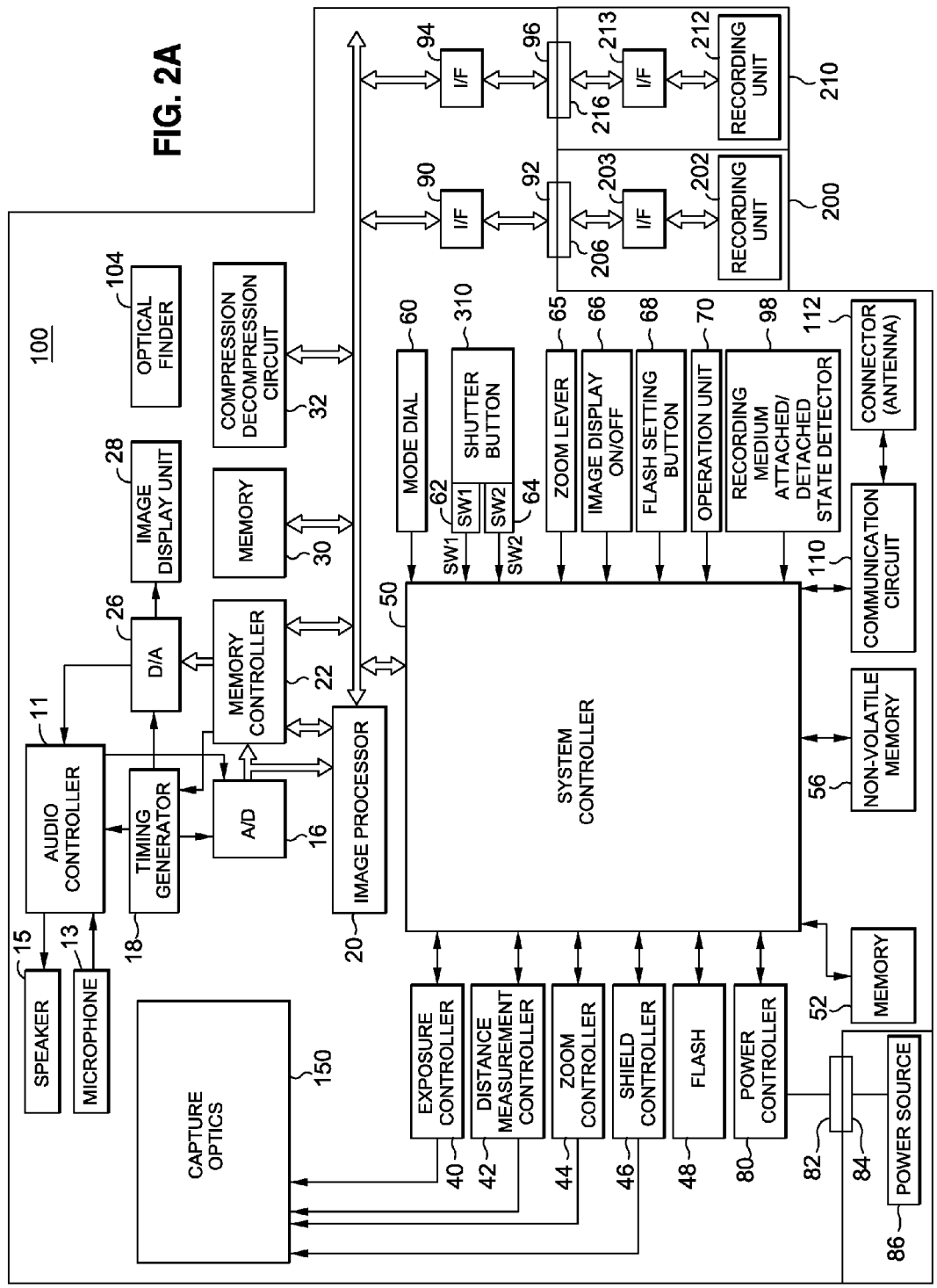
FIGS. 2A and 2B are detailed block diagrams for explaining the internal architecture of the image capture device shown in FIG. 1 according to an example embodiment.

FIG. 2A is a block diagram showing an example of the arrangement of the digital camera 100 as an image capture device according to this embodiment. Referring to FIG. 2, reference numeral 16 denotes an A/D converter which converts an analog signal from one or more image sensors into a digital signal. The A/D converter 16 is used when an analog signal output from the image sensor(s) is converted into a digital signal and when an analog signal output from an audio controller 11 is converted into a digital signal.

As discussed above, capture optics 150 comprise hardware and/or software for capturing stereoscopic image content, and may include different combinations of lenses, image sensors and other hardware, as discussed above with respect to FIGS. 1C to 1F.

A light beam (light beam incident upon the angle of view of the lens) from an object in a scene impinges on capture optics 150 and two views of the scene are captured by the image sensor(s). The image sensor(s) convert the optical image to analog image signals and outputs the signals to an A/D converter 16. The A/D converter 16 converts the analog image signals to digital image signals (image data). The image sensor(s) and the A/D converter 16 are controlled by clock signals and control signals provided by a timing generator 18. The timing generator 18 is controlled by a memory controller 22 and a system controller 50.

Reference numeral 18 denotes a timing generator, which supplies clock signals and control signals to the image sensor(s), the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement or in substitution therefor.

Output data from the A/D converter 16 is written in a memory 30 via the image processor 20 and memory controller 22 or directly via the memory controller 22. The memory 30 stores image data captured and converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in nonvolatile memory 56 and/or the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls an unshown shutter (within capture optics 150) having a diaphragm function based on the data supplied from the system controller 50. The exposure controller 40 may also have a flash exposure compensation function by linking up with flash (flash emission device) 48. The flash 48 has an AF auxiliary light projection function and a flash exposure compensation function.

The distance measurement controller 42 controls an unshown visible light lens of capture optics 150 based on the data supplied from the system controller 50. A zoom controller 44 controls zooming of an unshown zoom lens of capture optics 150. A shield controller 46 controls the operation of an unshown shield (barrier) of capture optics 150 to protect it.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
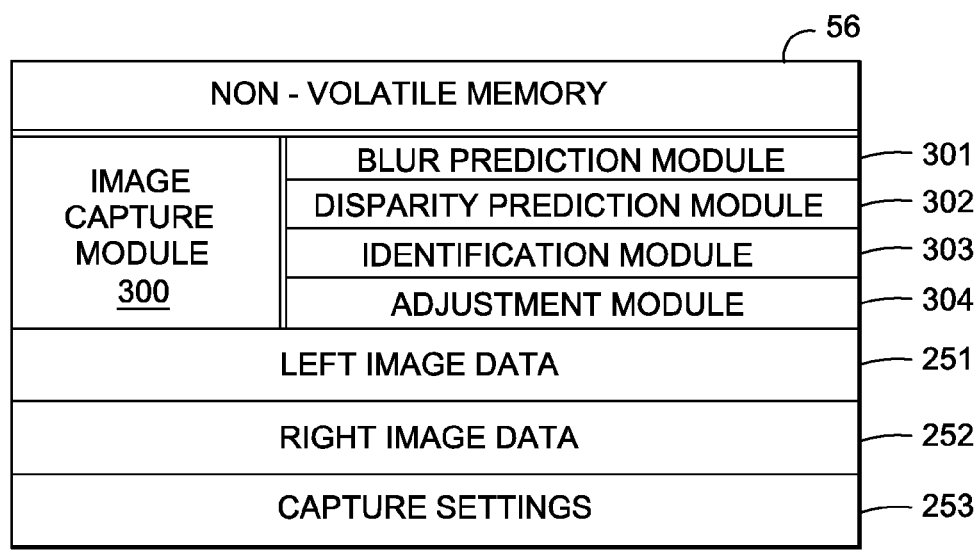

In particular, as shown in FIG. 2B, non-volatile memory 56 is an example of a non-transitory computer-readable memory medium, having retrievably stored thereon image capture module 300 as described herein. According to this example embodiment, the image capture module 300 includes at least a blur prediction module 301 for predicting a blur value expected for multiple pixels in left and right images. The blur value is predicted based on designated capture settings. Image capture module 300 may also include a disparity prediction module 302 for predicting a disparity value expected for multiple pixels in the left and right images. The disparity value is predicted based on the designated capture settings. In addition, image capture module 300 may include identification module 303 for identifying stressed pixels by comparing the predicted disparity value to a lower bound of disparity value determined from the predicted blur value using a predetermined model. In particular, a pixel with predicted disparity value less than the lower bound is identified as a stressed pixel. Image capture module 300 may further include adjustment module 304 for adjusting predicted disparity by adjusting the designated capture settings to reduce the number of stressed pixels. These modules will be discussed in more detail below with respect to FIG. 3.

Additionally, as shown in FIG. 2B, non-volatile memory 56 also includes left image data 251 of a left image in the stereoscopic image capture, and image data 252 of a right image in the stereoscopic image capture. Capture settings 253 store values of control parameters of capture optics 150 for stereoscopic image capture. Capture settings 253 may include values of a focal length, an aperture number (F-number) and/or an interaxial distance.

Reference numeral 50 denotes a system controller, which controls the entire digital camera 100. The system controller 50 executes programs recorded in the aforementioned nonvolatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor(s) of capture optics 150, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in non-volatile memory 56, and/or in recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in a lossy compression scheme, such as JPEG (Joint Photographic Experts Group) for still images or MPEG (Moving Picture Experts Group) for video, recording in a RAW mode and the like. In the RAW mode, analog image signals outputted by the image sensing device are digitalized (RAW data) as is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the lossy compression mode includes, e.g., a normal mode and a fine mode. A user of the digital camera 100 can select the normal mode in a case of placing a high value on the data size of a shot image or video, and can select the fine mode in a case of placing a high value on the quality of a shot image or video.

In the lossy compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of an unshown color filter of the image sensor(s), and image data written in the memory 30 through the A/D converter 16 and the memory controller 22 is recorded in non-volatile memory 56, and/or in recording medium 200 or 210.

The digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a lossy form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as a NiCd battery, a NiMH battery or a Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, a SCSI card, and a communication card for PHS or the like.

The optical finder 104 is configured with, e.g., a TTL finder, which forms an image utilizing prisms and mirrors. By utilizing the optical finder 104, it is possible to shoot an image without utilizing an electronic view finder function of the image display unit 28. The optical finder 104 includes indicators, which constitute part of image display unit 28, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
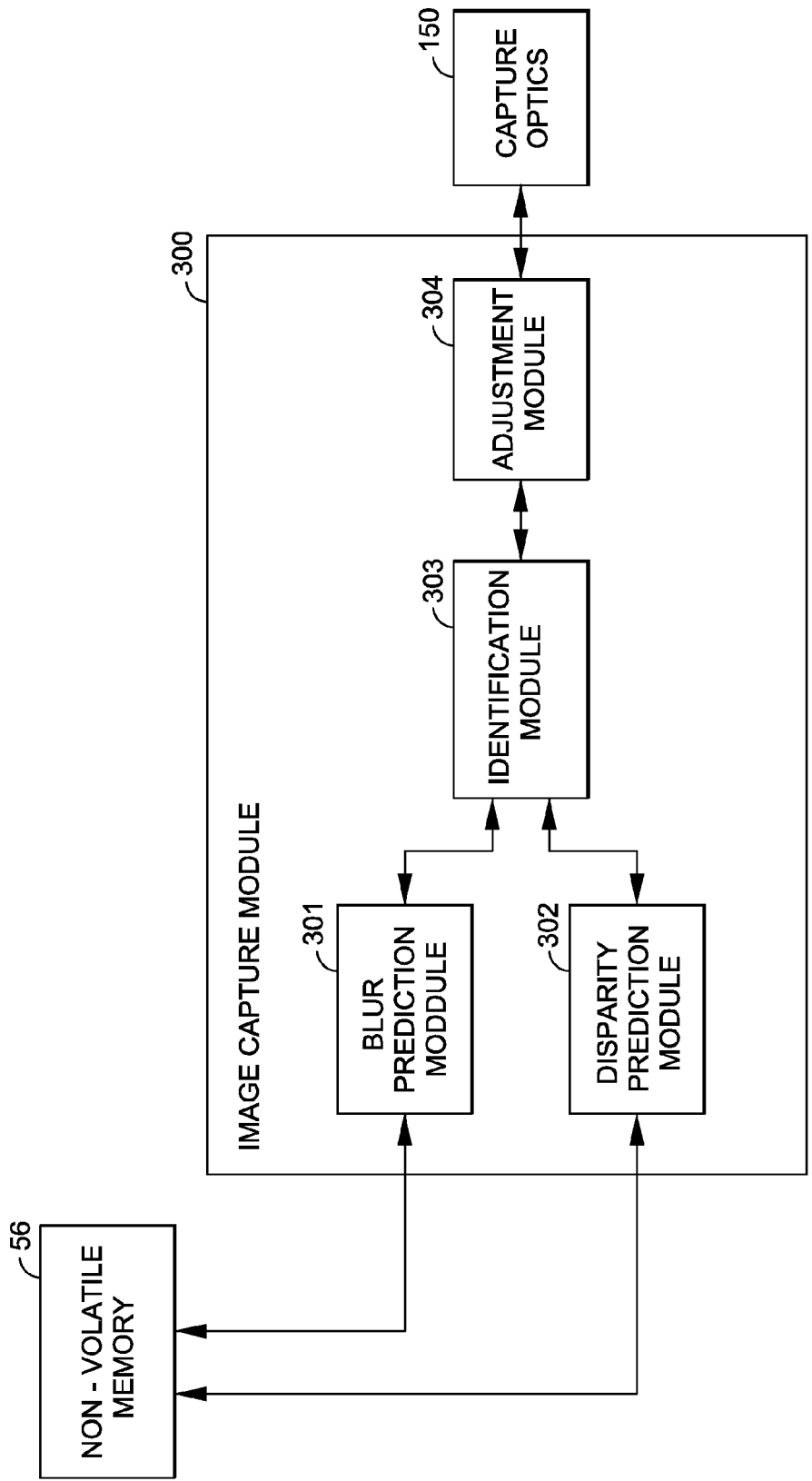
FIG. 3 is a view for explaining an image capture module according to one example embodiment.

FIG. 3 is a view for explaining an image capture module according to one example embodiment. As previously discussed with respect to FIG. 2B, image capture module 300 comprises computer-executable process steps stored on a non-transitory computer-readable storage medium, such as non-volatile memory 56. More or less modules may be used, and other architectures are possible.

As shown in FIG. 3, image capture module 300 at least a blur prediction module 301 for predicting a blur value expected for multiple pixels in left and right images, based on designated capture settings. To that end, blur prediction module 301 is connected to non-volatile memory 56, so as to obtain stored capture settings (e.g., capture settings 253). Blur prediction module 301 is connected to identification module 303 to provide the predicted blur value for use in identifying stressed pixels. Meanwhile, disparity prediction module 302 predicts a disparity value expected for multiple pixels in the left and right images, based on the designated capture settings. Thus, disparity prediction module 302 is also connected to non-volatile memory 56, so as to obtain stored capture settings (e.g., capture settings 253). Disparity prediction module 302 is connected to identification module 303 to provide the predicted blur value for use in identifying stressed pixels.

Identification module 303 identifies stressed pixels by comparing the predicted disparity value from disparity prediction module 302 to a lower bound of disparity value determined from the predicted blur value from blur prediction module 301 using a predetermined model. In particular, a pixel with predicted disparity value less than the lower bound is identified as a stressed pixel. Identification module 304 is connected to adjustment module 304, which adjusts the predicted disparity by adjusting the designated capture settings to reduce the number of stressed pixels. To that end, adjustment module 304 is connected to capture optics 150. In another embodiment, adjustment module 304 may not necessarily adjust the capture settings itself, but rather displays the stressed pixels to the user and alerts the user for action to adjust the predicted disparity.

Figure 4A:
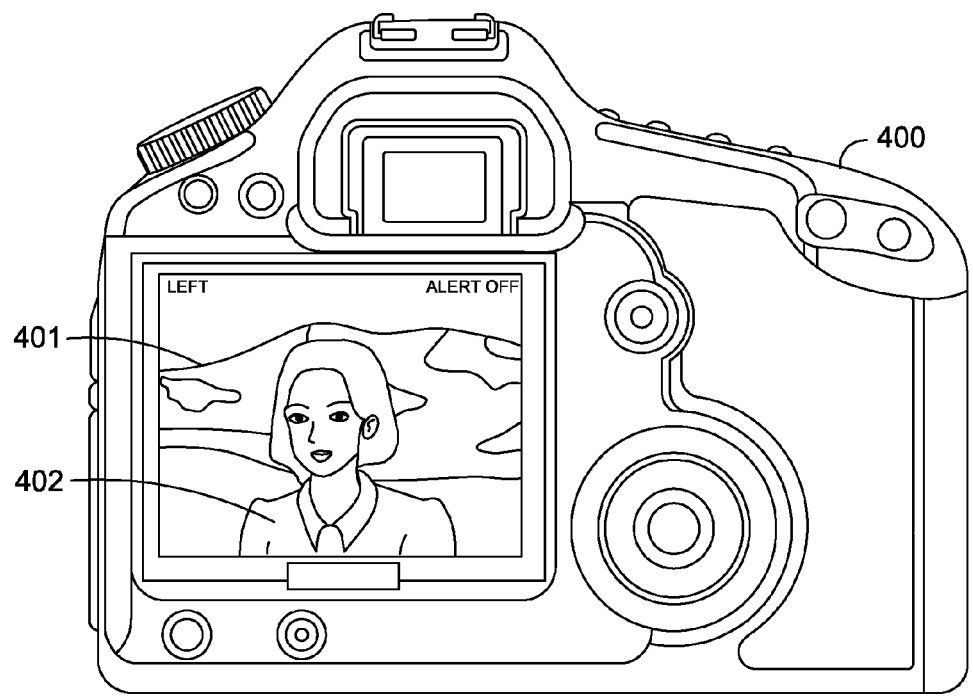
FIGS. 4A to 4C are views for explaining processing in the image capture device according to example embodiments.
Figure 4B:
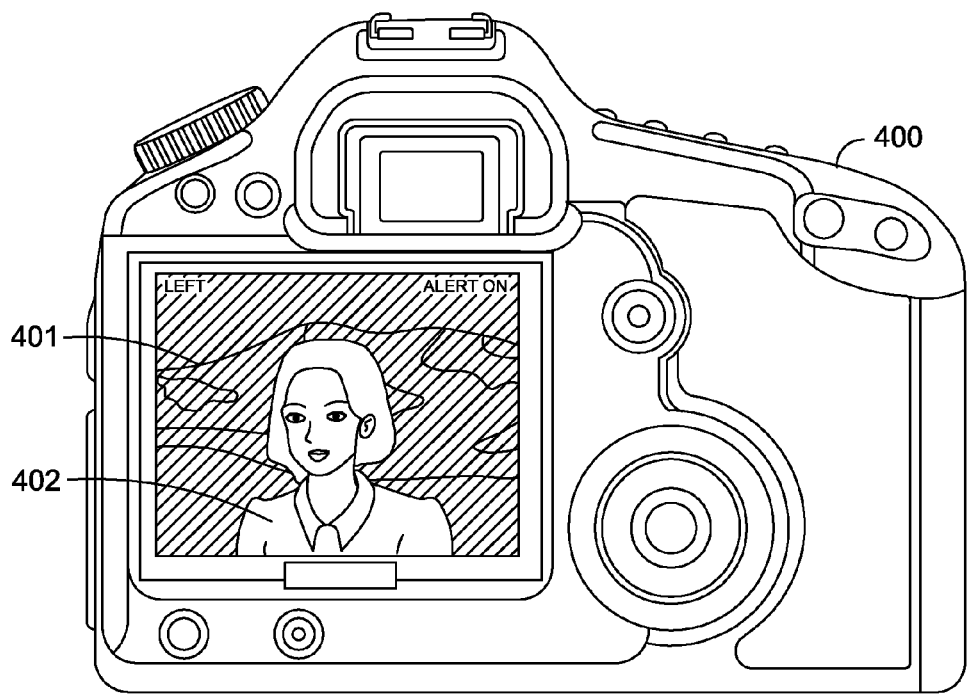
Figure 4C:
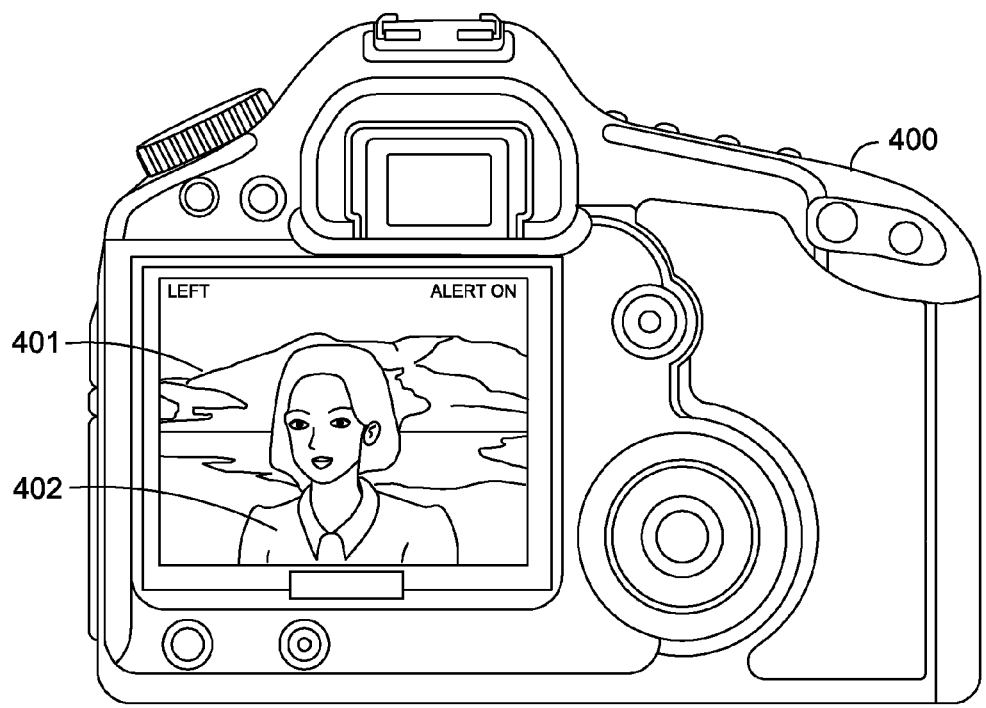

FIG. 4A to 4C are views for explaining processing in the image capture device according to example embodiments.

In FIG. 4A, image capture device 400 displays the left preview image of a stereoscopic image on image display unit 28. The right preview image may be displayed by switching mode (not shown), or both left and right preview images may be displayed side by side by switching to yet another mode (not shown). Such preview images are sometimes called "live preview" and may be low resolution images generated continuously prior to the user committing to an actual capture. In the example of FIG. 4A, the user has attempted to use a shallow depth of field, for aesthetic purposes or otherwise. Thus, as shown, the background 401 is relatively blurry, whereas the woman 402 in the foreground is relatively sharp. When the left and right images are captured with the current capture settings to form a stereoscopic 3-D image, conflicting depth and disparity cues might cause discomfort to a viewer. However, without the alert indicator (ALERT OFF), the user would not be aware of the conflict.

In FIG. 4B, the user is alerted to the presence of stressed pixels, based on predicted blur and disparity values as discussed more fully below. Thus, as shown in FIG. 4B, when the alert indicator is activated (ALERT ON), image capture device 400 displays a visual cue superimposed over an image of the scene for pixels corresponding to the stressed pixels. In the example of FIG. 4B, the stressed pixels correspond to the pixels in blurry background 401 but in general, pixels in a blurry region may or may not be stressed. In addition to the visual cue, the user may be presented with a list of priority oriented solutions, including a "focus priority" solution or a "parallax priority" solution, which will be explained in detail below.

In FIG. 4C, the user has responded to the alert and has chosen a parallax priority solution. Accordingly, the number of stressed pixels has been reduced by adjusting the predicted blur values while maintaining the predicted disparity values. For example, the designated capture settings may have been adjusted to increase the depth of field from that shown in FIG. 4A. Thus, in FIG. 4C, both background 401 and woman 402 are relatively sharp, and all the stressed pixels have been resolved.

In an example embodiment, a depth value for multiple pixels is predicted, wherein the predicted depth value and the designated capture settings are used in predicting the blur value and predicting the disparity value. In other words, the predicted blur value and the predicted disparity value are functions of predicted depth.

Figure 5:
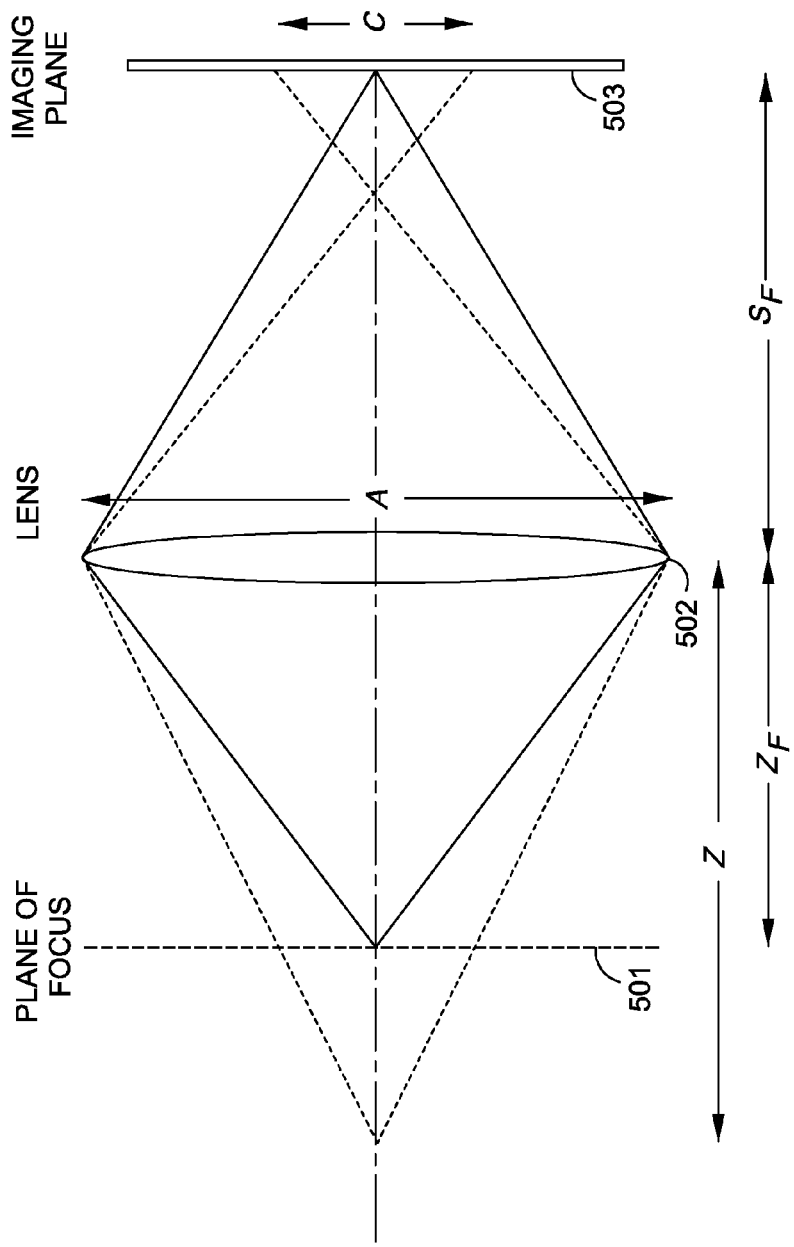
FIG. 5 is a view for explaining blur as a function of depth according to an example embodiment.

FIG. 5 is a view for explaining blur as a function of depth according to an example embodiment. Blur is a characteristic of any camera, not just stereoscopic camera. In that regard, blur is one of the characteristics of image capture device 100 that can be controlled so as to reduce viewer discomfort from captured stereoscopic images.

An imaging plane in a capture device can only be focused at one distance, namely, at the plane of focus. If an object is not on the plane of focus, it will be out of focus, i.e., it will not form a sharp image on the imaging plane.

Thus, as can be seen in FIG. 5, a point at depth z from the lens is not in the plane of focus 501, and therefore will not form a point on the imaging plane. Rather, it will form a "blur circle" with diameter c.

The blur circle may be characterized for an image capture device. In particular, for an image capture device with characteristics that are shift invariant, i.e., independent of the pixel location, the blur circle may be characterized as a function of depth and capture parameters:

$$c = B(z; p_1, p_2, \ldots) \quad (1)$$

where c is the blur circle diameter, z is the depth, and $p_1, p_2, \ldots$ are capture parameters, including aperture size, focal length, and focus distance, in addition to other parameters shown in FIG. 5. Equation (1) is called the blur function.

As shown in FIG. 5, for a given lens-sensor distance $s_F$, the camera is in focus at distance $z_F$. The aperture is A. Using the thin lens assumption, the blur function is given by:

$$c = \frac{As_F}{z_F}\left|1 - \frac{z_F}{z}\right| \quad (2)$$

Comparing the above two equations, it can be seen that the controlling parameters are A (aperture), $s_F$ (distance from lens to sensor) and $z_F$ (focus distance).

Alternatively, the focal length f and F-number N can be used as the controlling parameters for the blur function, in which case equation (2) can be expressed as $$c = \frac{f^2}{(z_F - f)N}\left|1 - \frac{z_F}{z}\right| \quad (3)$$

In this form, the controlling parameters are f (focal length), N (F-number) and $z_F$ (focus distance).

Meanwhile, horizontal disparity, which describes the difference between the left and right images, is a characteristic of the stereoscopic camera. In that regard, horizontal disparity is one of the characteristics of image capture device 100 that can be controlled so as to reduce viewer discomfort from captured stereoscopic images.

The horizontal disparity may be characterized for a stereoscopic image capture device. In particular, the horizontal disparity can be characterized as a function of depth and capture parameters:

$$\delta = D(z; q_1, q_2, \ldots) \quad (4)$$

In equation (4), $\delta$ is the horizontal disparity, z is the depth, and $q_1, q_2, \ldots$ are capture parameters. Parameters $q_1, q_2$, etc. may include interaxial distance, convergence distance, and distance from lens to sensor, among others. Equation (4) is called the disparity function.

Figure 6:
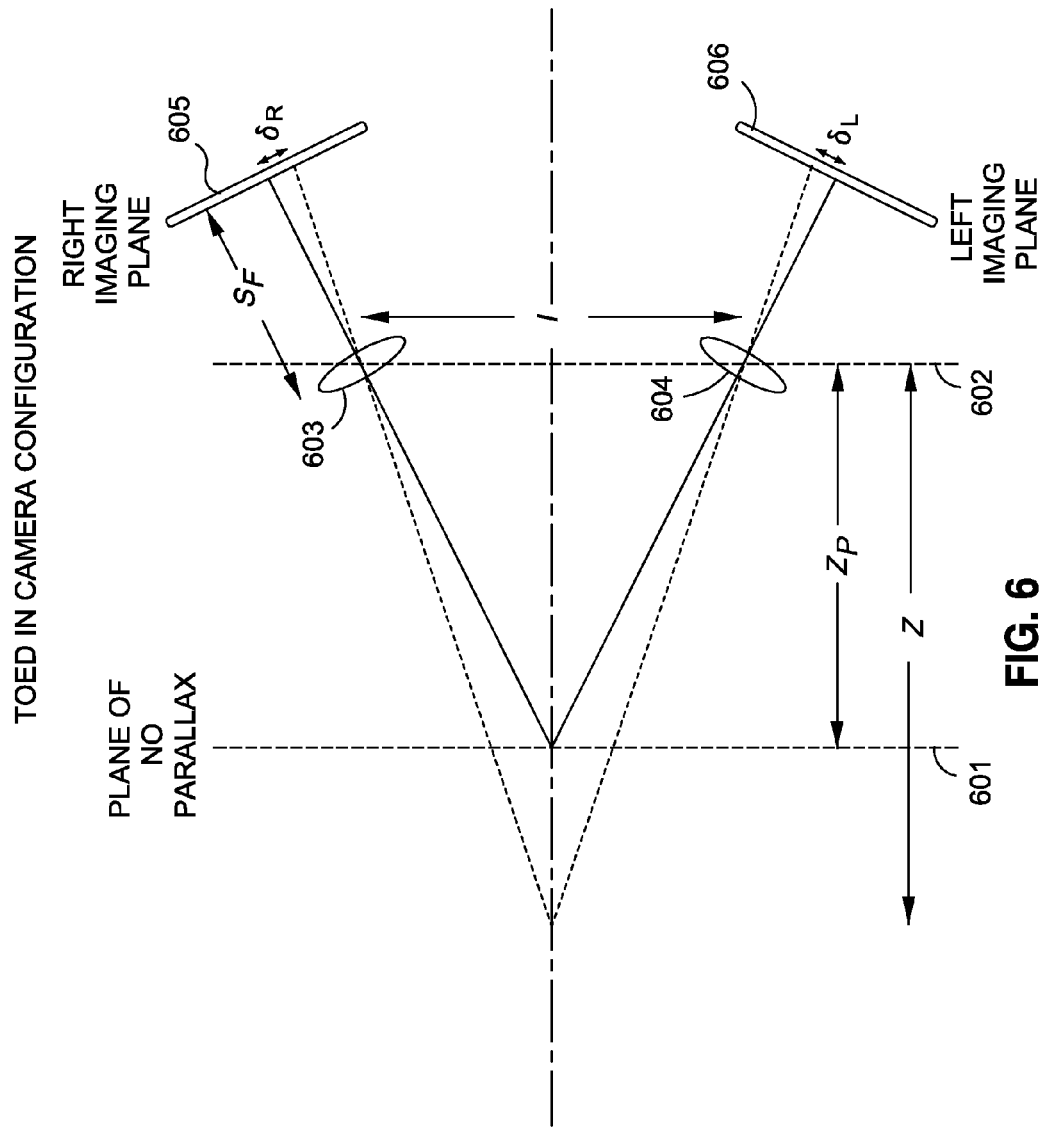
FIG. 6 is a view for explaining a stereoscopic image capture configuration according to an example embodiment.

In that regard, FIG. 6 is an example of a stereoscopic image capture configuration. The arrangement in FIG. 6 is commonly referred to as the toed-in camera configuration, in which the optical axes of the left and right lens-sensor systems intersect at plane of zero parallax 601, which is at depth $z_P$ from the principal points of the lenses. The arrangement mimics human vision, but it has a disadvantage of producing a keystone effect. The interaxial distance (between the two principal points of the lenses) is I. As above, $s_F$ is the distance from lens to sensor, and z is the depth at a pixel.

In this configuration, the disparity function is given by:

$$\delta = \delta_L + \delta_R = \frac{Is_F z}{\left(\frac{I}{2}\right)^2 + z_P z}\left(1 - \frac{z_P}{z}\right) \quad (5)$$

Comparing equations (4) and (5), the controlling parameters are I (interaxial distance), $z_P$ (convergence distance) and $s_F$ (distance from lens to sensor). In practice, the parameter $s_F$ is determined by focusing and may not be available for controlling disparity.

Figure 7:
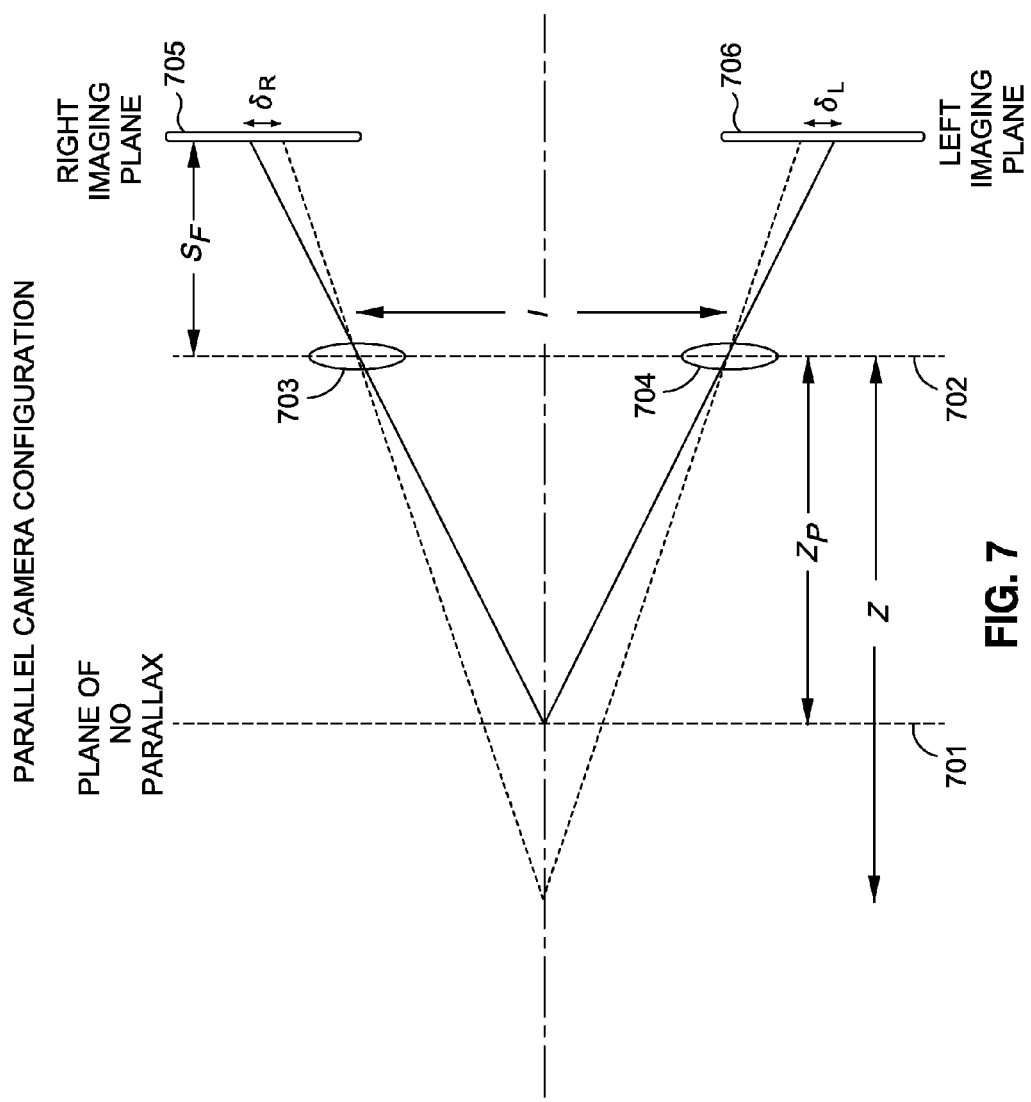
FIG. 7 is a view for explaining another stereoscopic image capture configuration according to an example embodiment.

FIG. 7 is a view for explaining another stereoscopic image capture configuration according to an example embodiment. This configuration is usually referred to as the parallel camera configuration, in which the optical axes of the left and right lens-sensor systems are parallel. The advantage of this configuration is that there is ordinarily no keystone effect. However, implementation may require either horizontally shifting the images or the sensors. This might require post-processing, which may be an issue with live broadcast but generally not an issue with CGI post-production.

In this configuration, the disparity function is given by:

$$\delta = \delta_L + \delta_R = \frac{Is_F}{z_P}\left(1 - \frac{z_P}{z}\right) \quad (6)$$

Similar to the toed-in configuration, the controlling parameters are I (interaxial distance), $z_P$ (convergence distance) and $s_P$ (distance from lens to sensor). Equations (5) and (6) give very similar characteristics, especially at normal distances (z and $z_P$), when $(I/2)^2 \ll x_P z$.

In an example embodiment, the blur value and the disparity value are predicted using a predicted depth value and designated capture settings via equations (1) and (4). In general, the designated capture settings comprise settings of the parameters $p_1, p_2, \ldots$ and $q_1, q_2, \ldots$. As described above, for example blur and disparity functions, these parameters may include the aperture setting, focus distance, distance from lens to sensor, focal length, interaxial distance and/or convergence distance, among others. The depth value may be predicted by a number of established principles, including multiview stereo, photometric stereo, structured light, structure from motion (SfM), time of flight or LIDAR.

In another example embodiment, the blur value and the disparity value are predicted using captured preview images for the left and right images and designated capture settings. In this embodiment, depth value may be predicted from the captured preview images for the left and right images using the principle of multiview stereo, or the method of triangulation. Once the depth value is predicted, the blur value and the disparity value may be predicted using the predicted depth value and designated capture settings via equations (1) and (4), as described above.

In the context of the human visual system, blur and disparity are coupled. In particular, when the eyes view natural scenes, convergence and focus occur at the same distance. In other words, the plane of zero parallax coincides with the plane of focus. Away from this plane, parallax deviates from zero, being positive behind the plane and negative in front of the plane. At the same time, away from the plane of focus, objects appear blurred due to defocusing of eyes' lenses. Moreover, the amount of disparity and the amount of blur bear a fixed relationship based on the optics and anatomy of the eyes. On the other hand, 3-D cinema attempts to create the illusion of natural scenes using a flat display screen, which physically presents only one planar scene. 3-D effect is achieved by manipulating the disparity of left and right images presented to the viewer. Ideally, the amount of blur needs to follow the amount of disparity. Nevertheless, content creators such as directors and cinematographers may manipulate blur arbitrarily for the purpose of storytelling and aesthetics, which is a common technique in 2-D cinema. In one relatively common example, a director might have a close-up object or person in focus, with the background blurred (i.e., using a shallow depth of field). In this example, the director might want the audience to look at the in-focus areas. Nevertheless, the audience may instead look at the out-of-focus areas, and the conflicting cues from the blur and disparity can cause discomfort.

Accordingly, processing in the image capture device shown in FIG. 1 will now be described more fully with respect to FIGS. 8A to 8C.

In the following embodiments, preview images are captured for the left and right images, such that the preview images and designated capture settings are used in predicting blur values and disparity values upon capture. Put another way, preview images may be captured, and stressed pixels may be identified, displayed and fixed prior to final capture, so that any stressed pixels are identified and resolved by adjusting capture settings before final capture. In one example, a "live preview" may be used for capturing the preview images and displaying output to the user prior to final capture.

Figure 8A:
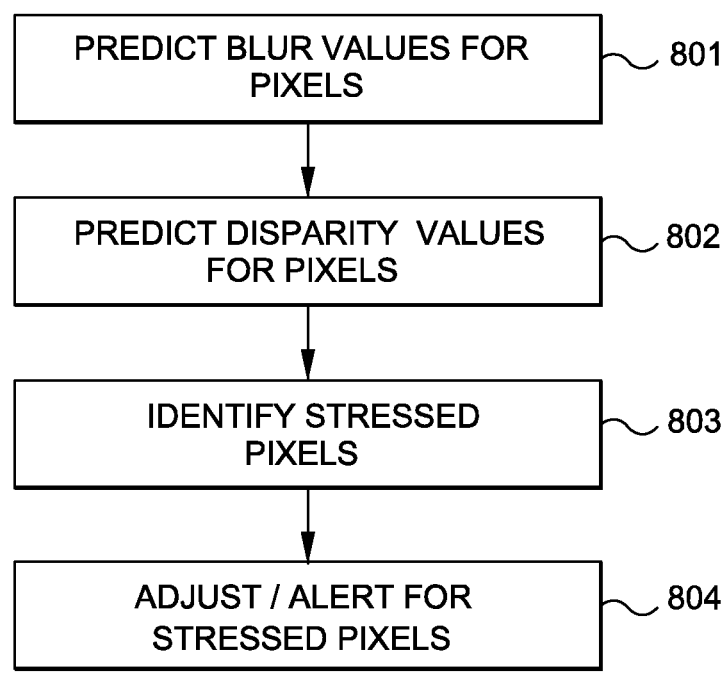
FIGS. 8A to 8C are flow diagrams for explaining processing in the image capture device shown in FIG. 1 according to example embodiments.

Briefly, in FIG. 8A, stereoscopic image capture is provided. In step 801, there is prediction of a blur value expected for multiple pixels in left and right images. The blur value is predicted based on designated capture settings. In step 802, there is prediction of a disparity value expected for multiple pixels in the left and right images. The disparity value is predicted based on the designated capture settings. In step 803, stressed pixels are identified by comparing the predicted disparity value to a lower bound of disparity value determined from the predicted blur value using a predetermined model. A pixel with predicted disparity value less than the lower bound is identified as a stressed pixel. In step 804, the predicted disparity is adjusted by modifying the designated capture settings to reduce the number of stressed pixels, or an alert to the presence of stressed pixels is given. More specifically, in one example, adjusting the designated capture settings comprises displaying the stressed pixels to the user and alerting the user for action to adjust the designated capture settings to reduce the number of stressed pixels. Displaying the stressed pixels may include display of a visual cue superimposed over an image of the scene for pixels corresponding to the stressed pixels. Adjusting the designated capture settings may result in adjusting the predicted disparity values while maintaining the predicted blur values. In another example, adjusting the designated capture settings may result in adjusting the predicted blur values while maintaining the predicted disparity values. In yet another example, adjusting the designated capture settings may include adjusting both of the predicted disparity values and the predicted blur values. For example, according to some applications, it might be useful to find a compromise between the disparity and blur values, rather than changing only one of the values at a time.

Figure 8B:
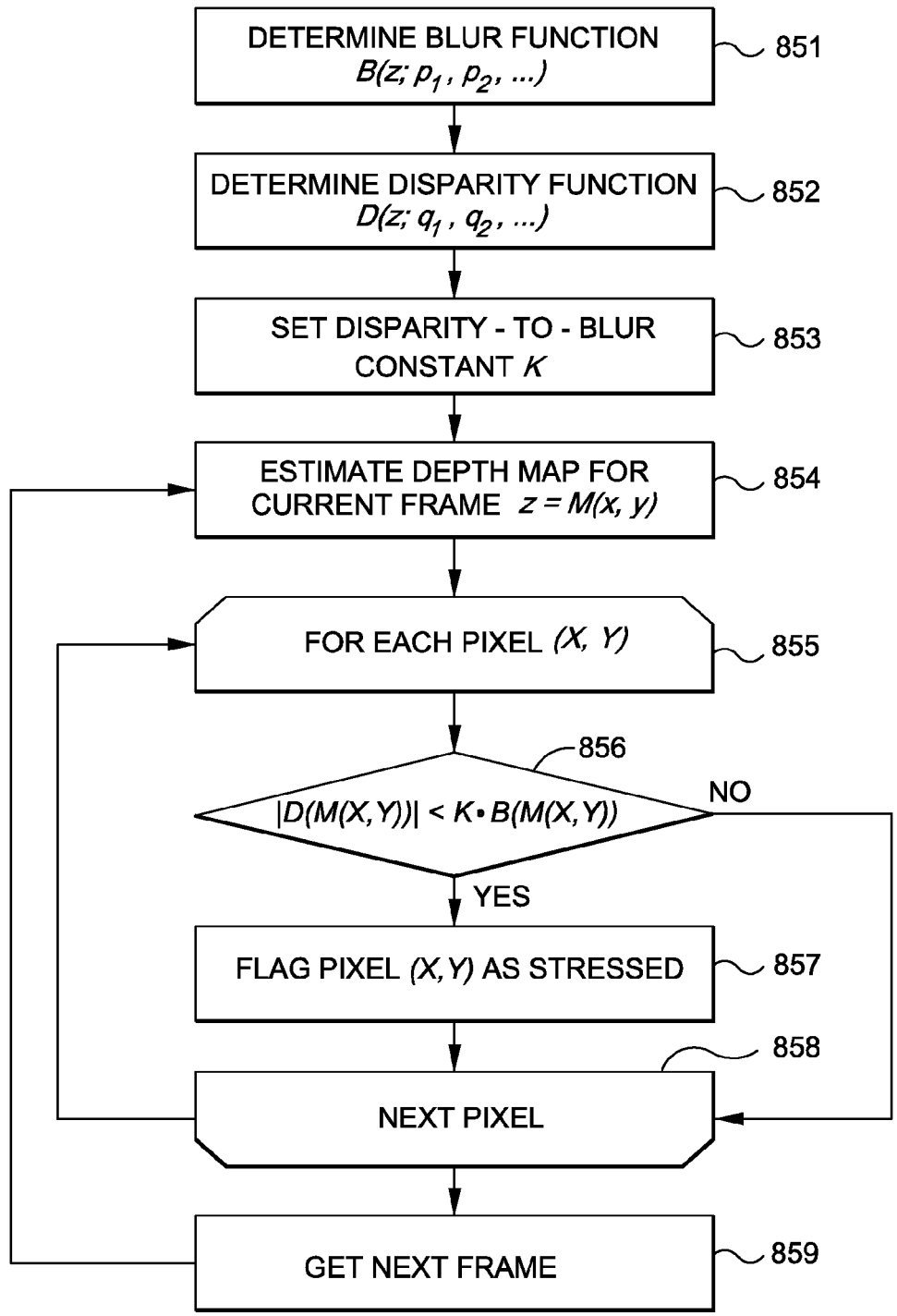

FIG. 8B describes aspects of processing in the image capture device.

In step 851, the blur function is determined. In the context of the present disclosure, the blur function is subsequently used to predict blur values for pixels based on designated capture settings and preview images for the left and right images.

As explained above, the blur function is a characteristic of an image capture device. In particular, the function c=B(z; $p_1$, $p_2$, ...) may be characterized in the factory. For example, the blur function may be stored in non-volatile memory 56 (as part of blur prediction module 301) in the form of executable code, look-up table or a combination of both.

In step 852, the disparity function is determined. In that regard, in the context of the present disclosure, the disparity function is subsequently used to predict disparity values for pixels based on designated capture settings and preview images for the left and right images.

Similar to the blur function, the disparity function is a characteristic of a stereoscopic image capture device. In particular, the function $\delta$=D(z; $q_1$, $q_2$, ...) may be characterized in the factory. For example, the disparity function may be stored in non-volatile memory 56 (as part of disparity prediction module 302) in the form of executable code, look-up table or a combination of both.

In step 853, a disparity-to-blur constant K is set, for use in determining whether pixels are stressed in step 856. In one example, to determine stressed pixels, a predicted disparity value is compared to a lower bound of disparity value determined from the predicted blur value using a predetermined model. The predetermined model, in turn, may include a linear model based on the disparity-to-blur proportionality constant K.

Specifically, for the human eyes, the relationship between the blur circle diameter c and disparity $\delta$ may be described by a linear model given by the following:

$$c = \frac{A_{human}}{I_{human}}|\delta| = \frac{1}{K}|\delta| \qquad (7)$$

where $A_{human}$ is the pupil size and $I_{human}$ is the interocular distance. For average pupil size and interocular distance, the disparity-to-blur proportionality constant K=$I_{human}$/$A_{human}$≈12.

Expressed in terms of the blur and disparity functions, the condition of stress-less, naturally looking images (no or little discomfort to the user) is:

$$|D(z;q_1,q_2,\ldots)| \geq K \cdot B(z;p_1,p_2,\ldots) \qquad (8)$$

Inequality (8) provides a lower bound of disparity value, namely K·B(z; $p_1$, $p_2$, ...), determined from the blur function using a predetermined model, wherein the predetermined model comprises a linear model based on a disparity-to-blur proportionality constant K. When inequality (8) is not satisfied for some pixels, then a region comprising those pixels may cause viewing discomfort.

A pixel with predicted disparity value less than the lower bound is identified as a stressed pixel. For example, if the predicted disparity is less than the lower bound, i.e., |D(z;$q_1$, $q_2$ ...)|<K·B(z; $p_1$, $p_2$, ...), then the pixel will be a stressed pixel.

Accordingly, for comfortable viewing, capture parameters should be set such that inequality (8) is satisfied. As mentioned above, disparity-to-blur constant K may be set as 12 for an average viewer, although other values can be used. For example, the disparity-to-blur constant K can be set based on input from a user. In another embodiment, a more general, e.g., nonlinear, predetermined model may be used in lieu of the linear model on the right hand side of inequality (8). In addition, the predetermined model may be based on input from a user. For example, a list of predetermined models may be presented to the user for him to choose from.

In step 854, a depth map, i.e., a map of depth values for multiple pixels, is estimated for the current frame. In the present embodiment, a depth map for the current frame is estimated based on current left and right preview images. It is assumed that left and right preview images are captured continuously so that each frame comprises a pair of left and right preview images captured at a time instant. A different embodiment may for example capture only one pair of left and right preview images at one time instant, in which case there would be only one frame. Thus, for each pixel, z (the depth at the pixel) is given by M(x,y), where M is the depth map and (x,y) is the position of the pixel. The depth map can be estimated by the method of triangulation, also known as multiview stereo. The method uses a pair of corresponding pixels in the left and right preview images and finds a closest point in 3-D space that "explains" the formation of the pair of corresponding pixels. The depth at the pixel is then taken to be the depth of the closest point in 3-D space. Since the preview images are typically low resolution version of the eventual captured images, the estimated depth map may also involve upsampling from the low resolution depth map obtained from the left and right preview images. Therefore, a depth value for multiple pixels can be predicted.

In another embodiment, the depth map is not estimated from preview images for the left and right images, but is predicted by other methods. In that regard, in addition to multiview stereo or the method of triangulation, various other methods to estimate the depth map can be used, including structured light, photometric stereo, time-of-flight method or LIDAR and structure from motion (SfM). Thus, a depth value can be predicted for multiple pixels.

In step 855, iterations begin for each pixel in the image. As can be seen above, for each pixel (X,Y), a predicted depth value M(X,Y) for pixel (X,Y) and the designated capture settings can be used in predicting the blur value, namely B(M(X,Y); $p_1, p_2, \ldots$), and predicting the disparity value, namely D(M(X,Y); $q_1, q_2, \ldots$) at the pixel.

In particular, in step 856 it is determined for a current pixel (X,Y) whether |D(M(X,Y); $q_1, q_2, \ldots$)|<K·B(M(X,Y); $p_1, p_2, \ldots$) for that pixel. As explained above, this is the condition for a stressed pixel.

If |D(M(X,Y); $q_1, q_2, \ldots$)|<K·B(M(X,Y); $p_1,p_2, \ldots$) is satisfied, then the pixel is a stressed pixel, and the process proceeds to step 857. If |D(M(X,Y); $q_1, q_2, \ldots$)|<K·B(M(X,Y); $p_1,p_2, \ldots$) is not satisfied, then the pixel is not a stressed pixel, and the process proceeds to step 858 without flagging the pixel as a stressed pixel.

In step 857, the current pixel (X,Y) is flagged as a stressed pixel, the process proceeds to step 858.

In step 858, the next pixel is accessed, and the process proceeds to step 855 to perform the iteration again. If all pixels have been examined, then the process proceeds to step 859 to get the next frame and repeat the process from step 854.

Once stressed pixels have been identified, the user may be alerted to the presence of the stressed pixels by a visual cue, for example as shown in FIG. 4B. Thus, in one example, alerting the user comprises displaying the stressed pixels to the user, and displaying the stressed pixels may include display of a visual cue superimposed over an image of the scene for pixels corresponding to the stressed pixels. The user can manually adjust the capture settings to resolve or otherwise reduce the number of stressed pixels, such as increasing the DoF (by stopping down aperture, for example). Alternatively, the user may be presented with a list of priority oriented solutions to choose from, such as a focus priority solution and a parallax priority solution, which will be explained in detail below.

Meanwhile, another example will be described. This example takes into account the fact that the blur function alone does not necessarily consider the perceived blur by human eyes.

In that regard, as can be seen from equations (2) or (3), the only distance with zero blur is the focus distance $z_F$ (distance from lens to plane of focus). However, human eyes perceive small blur at distances close to the focusing distance as being sharp. This is called the depth of field.

The circle of confusion (CoC) is the largest blur circle that human eyes perceive as acceptably sharp. As mentioned above, if a point is not on the plane of focus, it will be out of focus, i.e., it will form a blur circle instead of a point on the imaging plane. The CoC defines how small the blur circle needs to be to still be perceived by human eyes as a point. Specifically, if the blur circle is smaller than the CoC, there is effectively no blur.

The CoC depends on viewing conditions such as screen size and viewing distance. Very often, viewing conditions in specific applications are used to infer CoC for a given image sensor or film format. For example, for viewing conditions for normal prints, the CoC for a full frame 35 mm sensor is typically taken to be 0.029 mm. However, for viewing conditions in cinema, the CoC is typically taken to be 0.001 inches (0.0254 mm) for 35 mm film format and 0.0005 inches (0.0127 mm) for 16 mm film format. Accordingly, a blur function can be defined that incorporates the human visual system (HVS), as follows:

$$B_{HVS}(z; p_1, p_2, \ldots) = \begin{cases} B(z; p_1, p_2, \ldots) & \text{if } B(z; p_1, p_2, \ldots) > CoC \\ 0 & \text{if } B(z; p_1, p_2, \ldots) \leq CoC \end{cases} \quad (9)$$

In equation (9), $B_{HVS}(z; p_1, p_2, \ldots)$ is the modified blur function taking into account both the image capture device and the human visual system whereas $B(z; p_1, p_2, \ldots)$ is the blur function of the image capture device alone. In particular, if the blur circle for a pixel is not larger than the CoC, then the blur is effectively zero. On the other hand, if the blur circle for the pixel is larger than the CoC, then the blur will continue to be determined by the blur function of the image capture device.

Figure 8C:
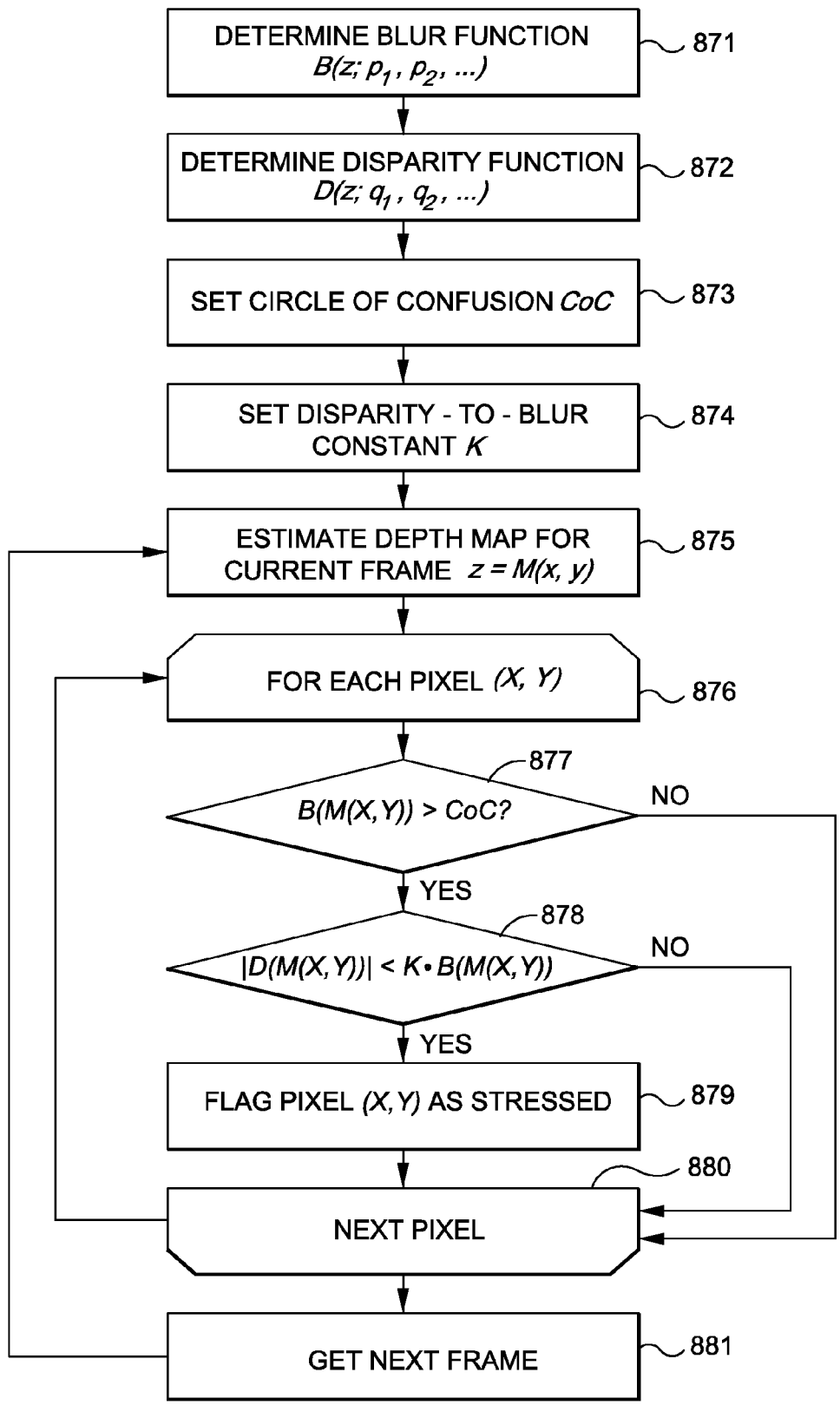

This embodiment of detecting stressed pixels is shown in FIG. 8C. In particular, FIG. 8C depicts a process for determining stressed pixels in which the lower bound of disparity value includes a tolerance based on a circle of confusion (CoC). The modified blur function in equation (9) is not used explicitly; instead its definition is implemented in the steps of the flow diagram.

In that regard, FIG. 8C corresponds generally to FIG. 8B with the exception of steps 873 and 877. Accordingly, for purposes of conciseness, only steps 873 and 877 will be described herein in further detail.

In particular, in step 873, the CoC is set. Setting the CoC can include having the user directly input a numerical value. Alternatively, the user can be presented with a list of common applications to choose from, such as photographic print with print size, or cinematic applications such as 35 mm cinema, 16 mm cinema, etc.

In step 877, prior to determining whether |D(M(X,Y); $q_1, q_2, \ldots$)|<K·B(M(X,Y); $p_1, p_2, \ldots$) for a current pixel, it is first determined whether the blur circle for the current pixel is larger than the circle of confusion. If the blur circle for the current pixel is not larger than the circle of confusion, then the pixel is already acceptably sharp and will be perceived as no blur. In particular, the pixel is not a stressed pixel. Put differently, inequality (8) with $B(z; p_1, p_2, \ldots)$ replaced by $B_{HVS}(z; p_1, p_2, \ldots)$ is automatically satisfied in this case. Thus, the pixel is not flagged as a stressed pixel, and the process simply proceeds to step 880 to select the next pixel.

On the other hand, if the blur circle for the current pixel is larger the circle of confusion, then the process proceeds to step 878 to determine whether the pixel's blur (in relation to its disparity) will cause discomfort to the viewer.

It can be seen that step 873 and step 877 effectively implement a modified lower bound of disparity value wherein the lower bound is zero if $B(M(X,Y); p_1, p_2, \ldots) \leq CoC$. In other words, the lower bound of disparity value includes a tolerance based on a circle of confusion.

In some embodiments, in addition to or in lieu of alerting the user to stressed pixels, the capture settings maybe be adjusted prior to final image capture, so as to reduce or eliminate the stressed pixels. In one example embodiment, the designated capture settings are adjusted resulting in adjusted predicted disparity so as to reduce the number of stressed pixels. This may be done with or without user intervention. In another example embodiment, the user is presented with a list of priority oriented solutions to choose from so as to reduce the number of stressed pixels. The list may include a "focus priority" solution and a "parallax priority" solution.

Therefore, adjustment to the designated capture settings in order to reduce the stressed pixels will now be described with respect to FIGS. 9 to 12.

Figure 9:
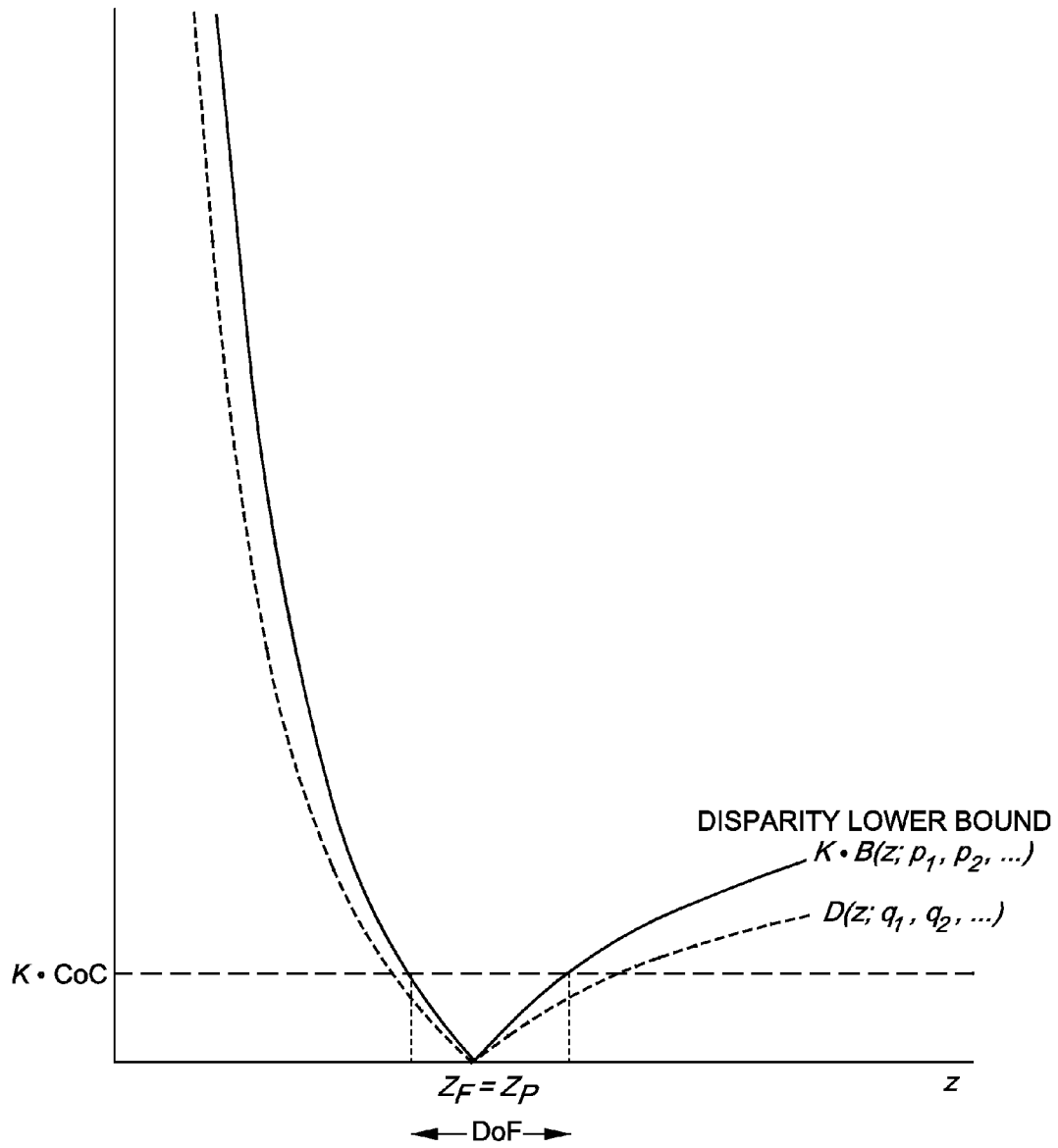
FIG. 9 is a view for explaining blur and disparity as a function of depth according to an example embodiment.

In that regard, FIG. 9 illustrates initial capture settings where the plane of focus is aligned with the plane of no parallax. This is the default settings of a stereoscopic image capture device. The graph of the disparity function as a function of depth z is plotted along with the graph of the blur function as function of depth z, scaled by the disparity-to-blur constant K. In effect, the latter graph depicts the lower bound of disparity as a function of depth. In addition, the dotted horizontal line depicts the CoC, similarly scaled by the disparity-to-blur constant K. By definition, the z-coordinates of the two intersection points of the dotted horizontal line and the graph of $K \cdot B(z; p_1, p_2, \ldots)$ define the extent of the depth of field (DoF).

Figure 10:
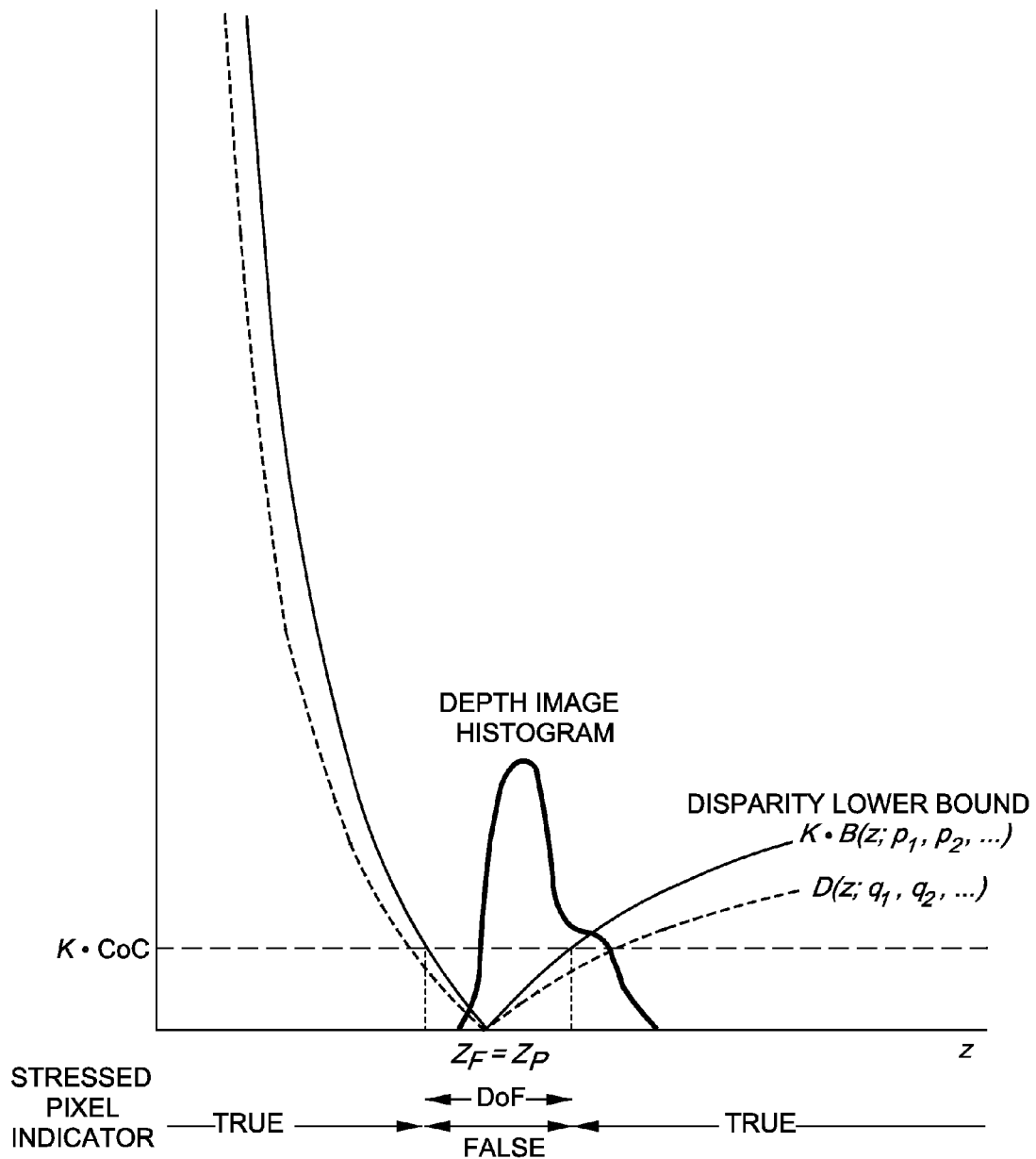
FIG. 10 is a view for explaining a stressed pixel indicator according to an example embodiment.

FIG. 10 depicts the same situation as in FIG. 9, with the inclusion of an image of a scene being targeted. More specifically, the depth image histogram is overlaid on the graphs from FIG. 9. The depth image histogram is readily derived from the depth map $M(x,y)$, which can be predicted as explained above. Mathematically, the depth image histogram $H(z)$ is given by $H(z)$=Cardinality of $\{(x,y)|M(x, y)=z\}$. As can be seen, there are pixels outside the DoF whose predicted disparity value is less than the lower bound of disparity at the corresponding depth. These pixels are the stressed pixels and can be conveniently quantified by the stressed pixel indicator function (also shown in FIG. 10), which will be explained next.

Based on the inequality (8), an indicator function for stressed pixels can be defined as follows:

$$\chi(z; p_1, p_2, \ldots, q_1, q_2, \ldots) = BOOL(|D(z; q_1, q_2, \ldots)| < K \cdot B_{HVS}(z; p_1, p_2, \ldots)) \quad (10)$$

The indicator function is a Boolean valued function that gives "true" (1) if a stressed pixel occurs at depth z, "false" (0) otherwise. The stressed pixel indicator is illustrated in FIG. 10. A "true" (1) at depth z is not cause for alarm, however, if there is no pixel at depth z.

In order to take into account the presence or absence of pixels at a given depth z, the pixel count at depth z is used to determine the stressed pixel count. If the depth image histogram of a frame is given by $H(z)$ as explained above, then the stressed pixel count is given by:

$$\text{stressed pixel count} = \int_{z \text{ from all depths}} H(z) \chi(z; p_1, p_2, \ldots, q_1, q_2, \ldots) \quad (11)$$

Adjusting for stressed pixels is based on minimizing this stressed pixel count (i.e., reducing the number of stressed pixels) by adjusting one or both of predicted blur or predicted disparity.

The adjustment of designated capture settings can be based on a priority or directive, which results in a priority oriented solution. For example, a "focus priority" solution would place emphasis on maintaining focus, and therefore would reduce the number of stressed pixels by adjusting the predicted disparity values, while maintaining the predicted blur values. On the other hand, a "parallax priority" solution would place emphasis on maintaining parallax, and thus would reduce the number of stressed pixels by adjusting the predicted blur values while maintaining the predicted disparity values. Each priority oriented solution is geared towards a particular application. The user is presented with a list of priority oriented solutions to choose from. For example, a movie director intending to exploit a shallow depth of field would choose a focus priority solution.

Figure 11:
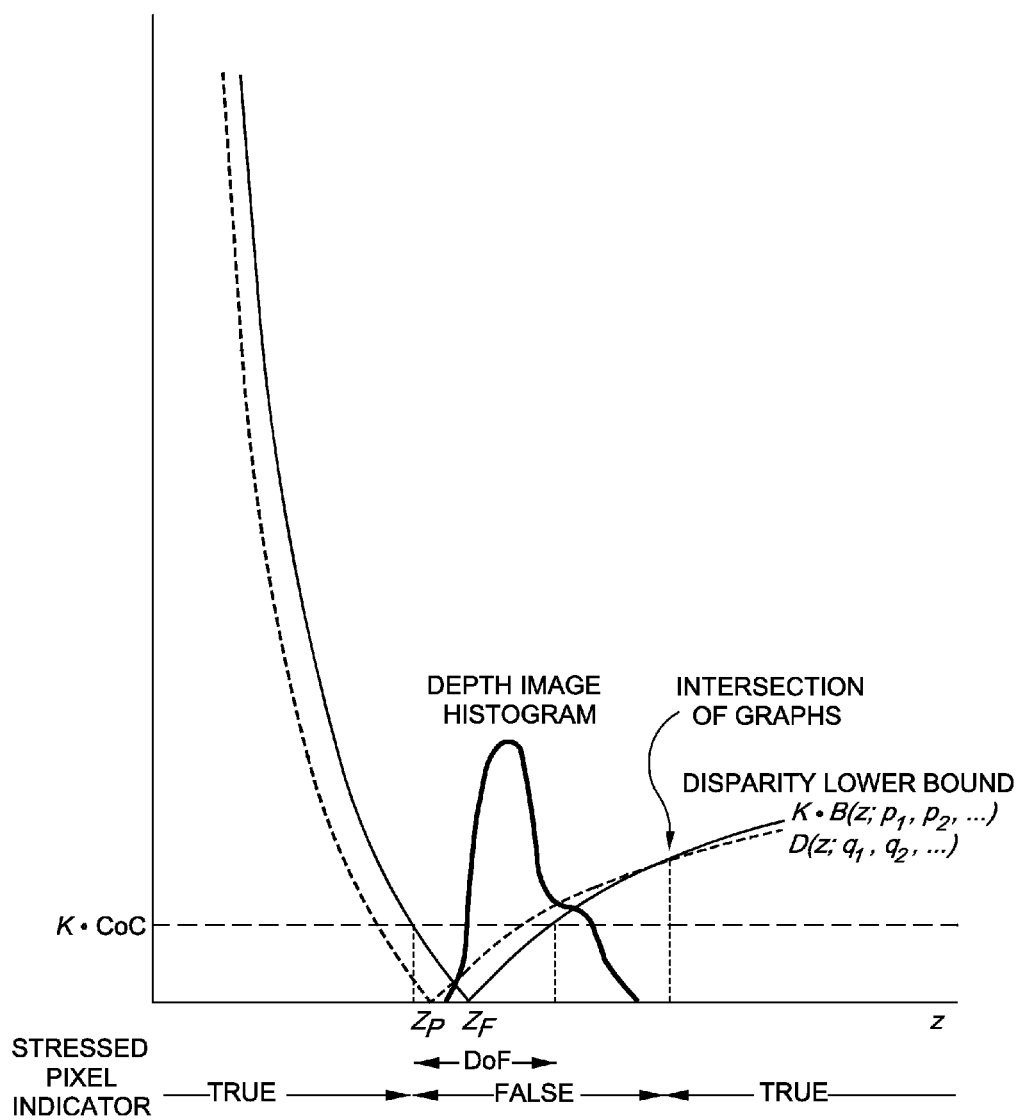
FIG. 11 is a view for explaining adjustment based on focus priority according to an example embodiment.

FIG. 11 is a view for explaining adjustment based on focus priority to reduce the number of stressed pixels according to an example embodiment.

In this solution, focus (e.g., DoF) is preserved while disparity is changed. Disparity can be changed by moving the plane of zero parallax by adjusting the convergence distance $z_P$ of the stereoscopic image capture device, for example. This solution may be most appropriate when shallow DoF is used for aesthetic purpose and is more important than the 3-D effects, and/or when a 2-D movie is converted to 3-D. In FIG. 11, the plane of focus or focus distance $z_F$ is left unchanged, while the plane of parallax is moved towards the viewer, i.e., decreasing the convergence distance $z_P$, resulting in an increase in disparity for objects behind the screen. Mathematically, the focus priority solution corresponds to a solution to the minimization problem:

$$q_1, q_2, \ldots = \arg\min_{q_1, q_2, \ldots} \int_{z \text{ from all depths}} H(z) \chi(z; p_1, p_2, \ldots, q_1, q_2, \ldots) \quad (12)$$

where the focus controlling parameters $p_1, p_2, \ldots$ are held fixed while the parallax controlling parameters $q_1, q_2, \ldots$ are allowed to vary. There may be multiple solutions (with same minimum stressed pixel count, which ideally is zero). If multiple focus priority solutions exist, then a best solution can be chosen by further requiring that $|z_F - z_P|$ is smallest among the focus priority solutions.

As can be seen in FIG. 11, by applying the focus priority solution, the stressed pixel indicator reports 'false' for a range of depths that includes the whole depth image histogram. In other words, by applying the focus priority solution, all the stressed pixels in FIG. 10 have been eliminated. Thus, the focus priority solution reduces the number of stressed pixels by adjusting the predicted disparity values while maintain the predicted blur values.

Figure 12:
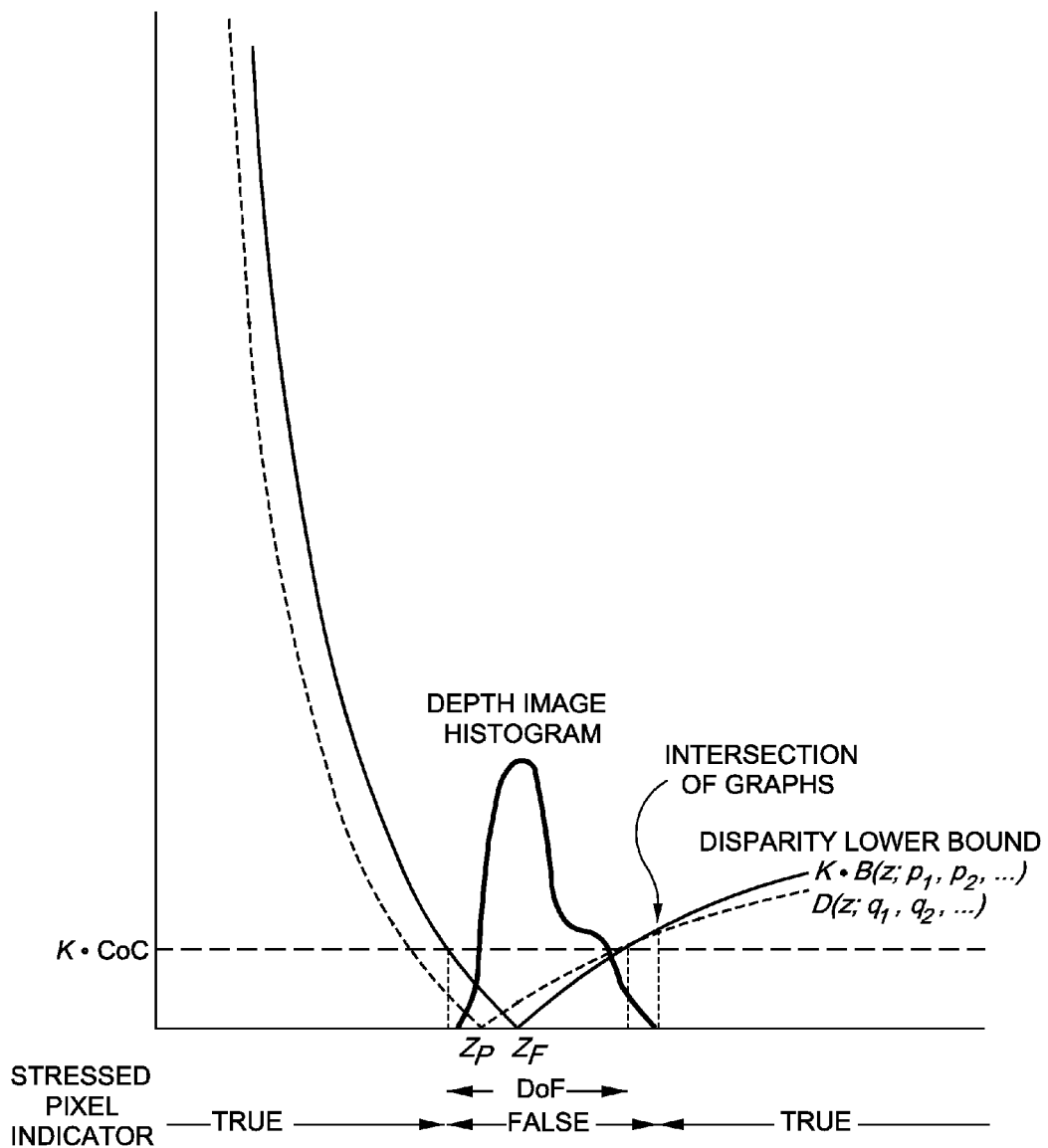
FIG. 12 is a view for explaining adjustment based on parallax priority according to an example embodiment.

FIG. 12 is a view for explaining adjustment based on parallax priority according to an example embodiment. In this solution, parallax is preserved while focus controlling parameters are varied to reduce the number of stressed pixels. This solution may be most appropriate when 3-D effects are the priority. In FIG. 12, the plane of parallax or convergence distance $z_P$ is left unchanged while the plane of focus is moved away from the viewer, i.e., increasing the focus distance $z_F$, resulting in a decrease in blur for objects away from the viewer, effectively increasing the DoF.

Mathematically, the parallax priority solution corresponds to a solution to the minimization problem:

$$p_1, p_2, \ldots = \arg\min_{p_1, p_2, \ldots} H(z) \chi(z; p_1, p_2, \ldots, q_1, q_2, \ldots) \tag{13}$$

where the parallax controlling parameters $q_1, q_2, \ldots$ are held fixed while the focus controlling parameters $p_1, p_2, \ldots$ are allowed to vary. There may be multiple solutions (with same minimum stressed pixel count, which ideally is zero). If multiple parallax priority solutions exist, then a best solution can be chosen by further requiring that $|z_F - z_P|$ is smallest among all the parallax priority solutions.

As can be seen in FIG. 12, by applying the parallax priority solution, the stressed pixel indicator reports 'false' for a range of depths that includes the whole depth image histogram. In other words, by applying the parallax priority solution, all the stressed pixels in FIG. 10 have been eliminated. Thus, the parallax priority solution reduces the number of stressed pixels by adjusting the predicted blur values while maintaining the predicted disparity values.

Focus priority and parallax priority are two possible solutions by restricting the set of controlling parameters to be optimized from the full set of controlling parameter $p_1, p_2, \ldots, q_1, q_2, \ldots$. It is possible that by other means of restricting, a new "priority" solution may result. In addition, both blur and disparity could be changed, provided that inequality (8) remains satisfied.

<Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for stereoscopic image capture, comprising:
   predicting a blur value respectively for each of multiple pixels in left and right images, wherein the blur value is predicted based on designated capture settings;
   predicting a disparity value respectively for each of multiple pixels in the left and right images, wherein the disparity value is predicted based on the designated capture settings;
   determining a lower bound of disparity value respectively for each of multiple pixels in the left and right images from the predicted blur value using a predetermined model of inequality based on human perception, wherein the lower bound of disparity value for a pixel varies with the blur value for that pixel;
   identifying stressed pixels by comparing, for each of the multiple pixels, the predicted disparity value to the determined lower bound of disparity value, wherein a pixel with predicted disparity value less than the lower bound is identified as a stressed pixel; and
   adjusting predicted disparity by adjusting the designated capture settings to reduce the number of stressed pixels.

2. The method of claim 1, further comprising estimating a depth value for each of multiple pixels, wherein the estimated depth value and the designated capture settings are used in predicting the blur value and predicting the disparity value.

3. The method of claim 1, further comprising capturing of preview images for the left and right images, wherein the preview images and the designated capture settings are used in predicting the blur value and predicting the disparity value.

4. The method of claim 1, wherein the predetermined model comprises a linear model based on a disparity-to-blur proportionality constant.

5. The method of claim 1, wherein the predetermined model is based on input from a user.

6. The method of claim 1, wherein the lower bound of disparity value for a pixel is zero if the predicted blur is below a circle of confusion.

7. The method of claim 1, wherein adjusting predicted disparity by adjusting the designated capture settings comprises displaying the stressed pixels to the user and alerting the user for action to adjust predicted disparity.

8. The method of claim 7, wherein displaying the stressed pixels comprises display of a visual cue superimposed over an image of the scene for pixels corresponding to the stressed pixels.

9. A method for stereoscopic image capture, comprising:
predicting a blur value respectively for each of multiple pixels in left and right images, wherein the blur value is predicted based on designated capture settings;
predicting a disparity value respectively for each of multiple pixels in the left and right images, wherein the disparity value is predicted based on the designated capture settings;
determining a lower bound of disparity value respectively for each of multiple pixels in the left and right images from the predicted blur value using a predetermined model of inequality based on human perception, wherein the lower bound of disparity value for a pixel varies with the blur value for that pixel;
identifying stressed pixels by comparing, for each of the multiple pixels, the predicted disparity value to the determined lower bound of disparity value, wherein a pixel with predicted disparity value less than the lower bound is identified as a stressed pixel; and
alerting a user to the presence of stressed pixels.

10. The method of claim 9, wherein alerting the user comprises displaying the stressed pixels to the user.

11. The method of claim 10, wherein displaying the stressed pixels comprises display of a visual cue superimposed over an image of the scene for pixels corresponding to the stressed pixels.

12. The method of claim 9, wherein alerting the user includes presenting the user with a list of priority oriented solutions to choose from.

13. The method of claim 12, wherein the list includes a focus priority solution that reduces the number of stressed pixels by adjusting the predicted disparity values while maintaining the predicted blur values.

14. The method of claim 12, wherein the list includes a parallax priority solution that reduces the number of stressed pixels by adjusting the predicted blur values while maintaining the predicted disparity values.

15. The method of claim 9, further comprising estimating a depth value for each of multiple pixels, wherein the estimated depth value and the designated capture settings are used in predicting the blur value and predicting the disparity value.

16. The method of claim 9, further comprising capturing of preview images for the left and right images, wherein the preview images and the designated capture settings are used in predicting the blur value and predicting the disparity value.

17. The method of claim 9, wherein the predetermined model is based on input from a user.

18. The method of claim 9, wherein the lower bound of disparity value for a pixel is zero if the predicted blur value is below a circle of confusion.

19. An image capture apparatus, comprising:
a computer-readable memory constructed to store computer-executable process steps; and
a processor constructed to execute the computer-executable process steps stored in the memory;
wherein the process steps stored in the memory cause the processor to:
predict a blur value respectively for each of multiple pixels in left and right images, wherein the blur value is predicted based on designated capture settings;
predict a disparity value respectively for each of multiple pixels in the left and right images, wherein the disparity value is predicted based on the designated capture settings;
determine a lower bound of disparity value respectively for each of multiple pixels in the left and right images from the predicted blur value using a predetermined model of inequality based on human perception, wherein the lower bound of disparity value for a pixel varies with the blur value for that pixel;
identify stressed pixels by comparing the predicted disparity value to the determined lower bound of disparity value, wherein a pixel with predicted disparity value less than the lower bound is identified as a stressed pixel; and
adjust predicted disparity by adjusting the designated capture settings to reduce the number of stressed pixels.

20. An image capture apparatus, comprising:
a computer-readable memory constructed to store computer-executable process steps; and
a processor constructed to execute the computer-executable process steps stored in the memory;
wherein the process steps stored in the memory cause the processor to:
predict a blur value respectively for each of multiple pixels in left and right images, wherein the blur value is predicted based on designated capture settings;
predict a disparity value respectively for each of multiple pixels in the left and right images, wherein the disparity value is predicted based on the designated capture settings;
determine a lower bound of disparity value respectively for each of multiple pixels in the left and right images from the predicted blur value using a predetermined model of inequality based on human perception, wherein the lower bound of disparity value for a pixel varies with the blur value for that pixel;
identify stressed pixels by comparing the predicted disparity value to the determined lower bound of disparity value, wherein a pixel with predicted disparity value less than the lower bound is identified as a stressed pixel; and
alert a user to the presence of stressed pixels.

* * * * *